US 9,426,739 B2

(12) United States Patent
Cheatham, III et al.

(10) Patent No.: US 9,426,739 B2
(45) Date of Patent: Aug. 23, 2016

(54) AD-HOC WIRELESS SENSOR PACKAGE

(71) Applicant: Elwha LLC, Bellevue, WA (US)

(72) Inventors: Jesse R. Cheatham, III, Seattle, WA (US); Matthew G. Dyor, Bellevue, WA (US); Peter N. Glaskowsky, Carnation, WA (US); Kimberly D. A. Hallman, Bellevue, WA (US); Roderick A. Hyde, Redmond, WA (US); Muriel Y. Ishikawa, Livermore, CA (US); Edward K. Y. Jung, Bellevue, WA (US); Michael F. Koenig, Bellevue, WA (US); Robert W. Lord, Seattle, WA (US); Richard T. Lord, Tacoma, WA (US); Craig J. Mundie, Seattle, WA (US); Nathan P. Myhrvold, Medina, WA (US); Robert C. Petroski, Seattle, WA (US); Desney S. Tan, Kirkland, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 798 days.

(21) Appl. No.: 13/729,747

(22) Filed: Dec. 28, 2012

(65) Prior Publication Data
US 2014/0177524 A1    Jun. 26, 2014

Related U.S. Application Data

(63) Continuation-in-part of application No. 13/727,102, filed on Dec. 26, 2012, and a continuation-in-part of application No. 13/727,109, filed on Dec. 26, 2012, and a continuation-in-part of application No. 13/727,117, filed on Dec. 26, 2012, now Pat. No. 9,298,945.

(51) Int. Cl.
*H04W 52/00*  (2009.01)
*G06F 21/62*  (2013.01)
(Continued)

(52) U.S. Cl.
CPC ............ *H04W 52/0219* (2013.01); *Y02B 60/50* (2013.01)

(58) Field of Classification Search
CPC .......... H02J 7/025; H02J 17/00; G01B 11/00; G01B 21/00; G06F 21/31; H04L 67/00; H04Q 2209/886; H04Q 9/00; H04W 52/0219; H04W 84/18; Y02B 60/50; Y10T 307/25; Y10T 307/344
USPC ........ 702/60–63, 150, 189; 307/23, 104, 126; 320/108; 340/539.13, 477; 370/328; 701/2
See application file for complete search history.

(56) References Cited

U.S. PATENT DOCUMENTS 3,995,429 A    12/1976  Peters
6,166,317 A    12/2000  Volk, Jr.
(Continued)

OTHER PUBLICATIONS

Cottone, Francesco; "Introduction to Vibration Energy Harvesting"; NiPS Energy Harvesting Summer School, ESIEE Paris; Paris, France; bearing a date of Aug. 2011; pp. 1-48.

*Primary Examiner* — John H Le
(74) *Attorney, Agent, or Firm* — Suiter Swantz pc llo

(57) ABSTRACT

Systems, methods, computer-readable storage mediums including computer-readable instructions and/or circuitry for control of transmission to a target device with communicating with one or more sensors in an ad-hoc sensor network may implement operations including, but not limited to: receiving one or more wireless signals associated with a sensing capability status of at least one sensor; wirelessly transmitting one or more sensor operation activation signals to one or more sensors according to the sensing capability status of the at least one sensor; and at least one of powering one or more sensing operations of the at least one sensor and charging one or more power storage devices of the at least one sensor via the one or more sensor operation activation signals.

30 Claims, 22 Drawing Sheets

(51) Int. Cl.
*G05B 19/00* (2006.01)
*H04W 52/02* (2009.01)

(56) References Cited

U.S. PATENT DOCUMENTS

| | | | |
|---|---|---|---|
| 7,220,015 | B2 | 5/2007 | Dowling |
| 8,099,130 | B1 | 1/2012 | Halla et al. |
| 8,531,288 | B1 | 9/2013 | Khan et al. |
| 8,638,253 | B1 | 1/2014 | Dryer |
| 8,674,804 | B2 | 3/2014 | Miller et al. |
| 8,947,230 | B1 | 2/2015 | Gettings et al. |
| 2004/0090195 | A1 | 5/2004 | Motsenbocker |
| 2006/0064196 | A1 | 3/2006 | Inkpen et al. |
| 2006/0238309 | A1 | 10/2006 | Takatama |
| 2007/0040687 | A1 | 2/2007 | Reynolds |
| 2007/0052692 | A1 | 3/2007 | Gruhlke et al. |
| 2007/0139183 | A1 | 6/2007 | Kates |
| 2008/0148059 | A1 | 6/2008 | Shapiro |
| 2008/0186173 | A1 | 8/2008 | Gates |
| 2009/0010197 | A1 | 1/2009 | Chao et al. |
| 2009/0030551 | A1 | 1/2009 | Hein et al. |
| 2010/0125437 | A1 | 5/2010 | Vasseur et al. |
| 2010/0161630 | A1 | 6/2010 | Moriwaki et al. |
| 2010/0223659 | A1 | 9/2010 | Ekl et al. |
| 2010/0243633 | A1 | 9/2010 | Huynh et al. |
| 2010/0308990 | A1 | 12/2010 | Simon et al. |
| 2011/0263950 | A1 | 10/2011 | Larson et al. |
| 2012/0065930 | A1 | 3/2012 | Allee et al. |
| 2012/0173050 | A1* | 7/2012 | Bernstein ............... A63H 30/04 701/2 |
| 2012/0176239 | A1 | 7/2012 | Preden et al. |
| 2013/0085688 | A1 | 4/2013 | Miller et al. |
| 2014/0145025 | A1 | 5/2014 | Fang et al. |

\* cited by examiner

AD-HOC WIRELESS SENSOR PACKAGE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/727,102, entitled AD-HOC WIRELESS SENSOR PACKAGE, naming JESSE R. CHEATHAM, III, MATTHEW G. DYOR, PETER N. GLASKOWSKY, KIMBERLY D. A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/727,109, entitled AD-HOC WIRELESS SENSOR PACKAGE, naming JESSE R. CHEATHAM, III, MATTHEW G. DYOR, PETER N. GLASKOWSKY, KIMBERLY D. A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/727,117, entitled AD-HOC WIRELESS SENSOR PACKAGE, naming JESSE R. CHEATHAM, III, MATTHEW G. DYOR, PETER N. GLASKOWSKY, KIMBERLY D. A. HALLMAN, RODERICK A. HYDE, MURIEL Y. ISHIKAWA, EDWARD K. Y. JUNG, MICHAEL F. KOENIG, ROBERT W. LORD, RICHARD T. LORD, CRAIG J. MUNDIE, NATHAN P. MYHRVOLD, ROBERT C. PETROSKI, DESNEY S. TAN, AND LOWELL L. WOOD, JR. as inventors, filed Dec. 26, 2012, which is currently co-pending or is an application of which a currently co-pending application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

Systems, methods, computer-readable storage mediums including computer-readable instructions and/or circuitry for control of transmission to a target device with communicating with one or more sensors in an ad-hoc sensor network may implement operations including, but not limited to: wirelessly transmitting one or more sensor operation activation signals to one or more sensors according to the sensing capability status of the at least one sensor; and at least one of powering one or more sensing operations of the at least one sensor and charging one or more power storage devices of the at least one sensor via the one or more sensor operation activation signals.

The foregoing summary is illustrative only and is not intended to be in any way limiting. In addition to the illustrative aspects, embodiments, and features described above, further aspects, embodiments, and features will become apparent by reference

DETAILED DESCRIPTION

Figure 1:
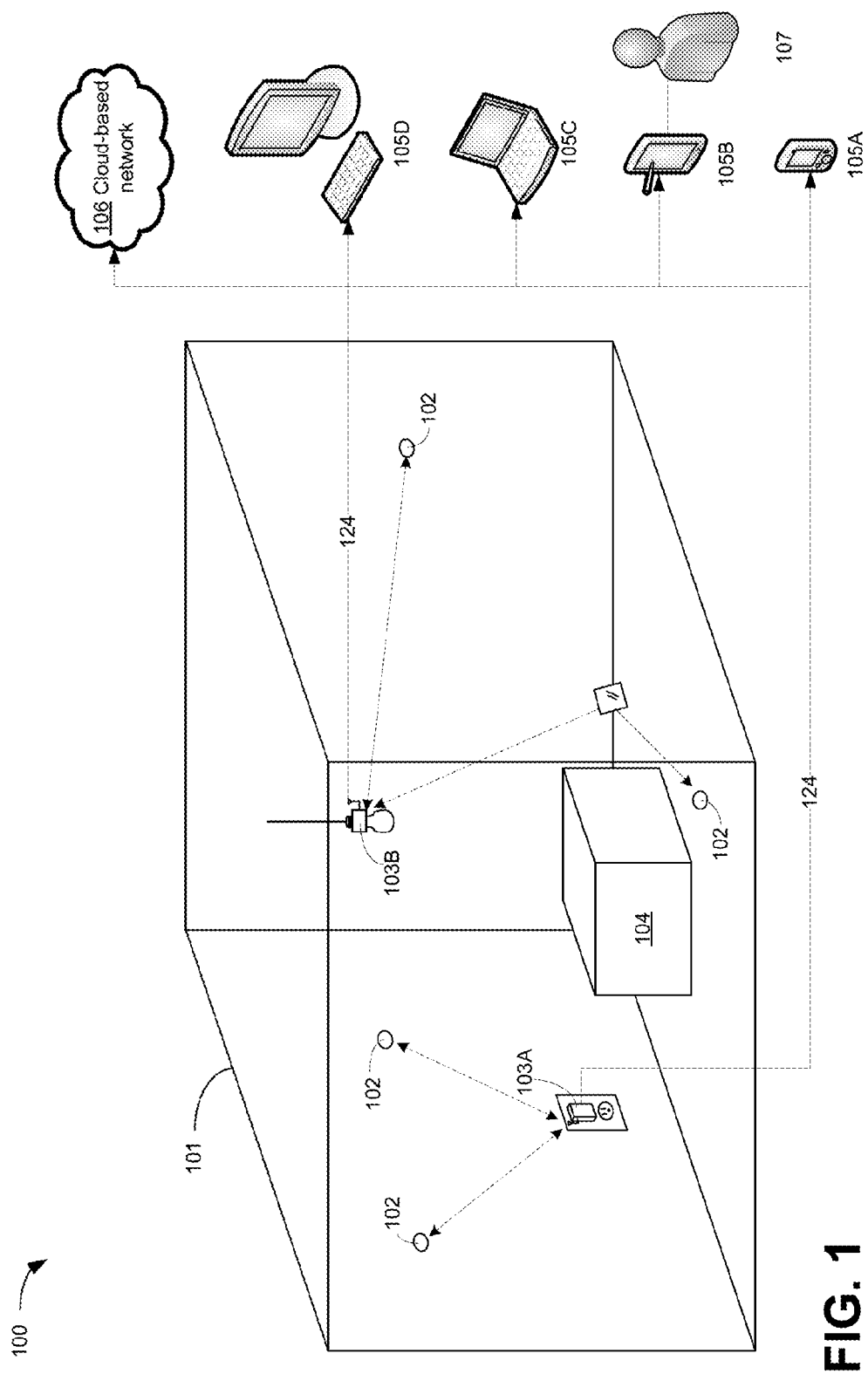
FIG. 1 shows a high-level block diagram of an operational environment communicating with one or more sensors in an ad-hoc sensor network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an ad hoc sensor system 100 disposed about a region 101. The ad hoc sensor system 100 may include one or more sensors 102 and one or more sensor monitoring devices 103. The sensors 102 may be simple single or limited-purpose sensors configured for monitoring one or more characteristics of an environment. For example, the sensors 102 may be thermal sensors, pressure sensors, motion sensors, image capture sensors, audio sensors, electromagnetic sensors, and the like, configured for monitoring of the region 101 and/or one or more items 104 (e.g. machines, people, products, and the like) located within the region 101. The sensors may be affixed to any surface within the region 101 via various means. In one embodiment, the sensors 102 may include an adhesive composition capable of adhering to a surface within the region 101. More specifically, the adhesive composition may be a moisture-activated adhesive such that a user may apply a liquid (e.g. water or saliva) to the adhesive composition thereby activating the adhesive and allowing for disposal of the sensor 102 on a surface.

A sensor monitoring device 103 may serve to provide a communications link between the sensors 102 and one or more processing devices 105 (e.g. a cell phone 105A, a tablet computer 105B, a laptop computer 105C, a desktop computer 105D, and the like and/or a cloud-based network 106 running an application accessible by such devices) which may receive data from the sensors 102 and provide that data to a user 107 monitoring the region 101 and/or the items 104. The sensor monitoring devices 103 may be pluggable (e.g. configured to be received within or to receive) with respect to one or more standard environmental devices (e.g. a standard 110-volt wall outlet-pluggable sensor monitoring device 103A, a standard 60-watt light socket-pluggable sensor monitoring device 103B, and the like) such that the region 101 may be easily retrofitted to employ the ad hoc sensor system 100 by incorporating the sensor monitoring devices 103 into pre-existing power supplies.

Figure 2:
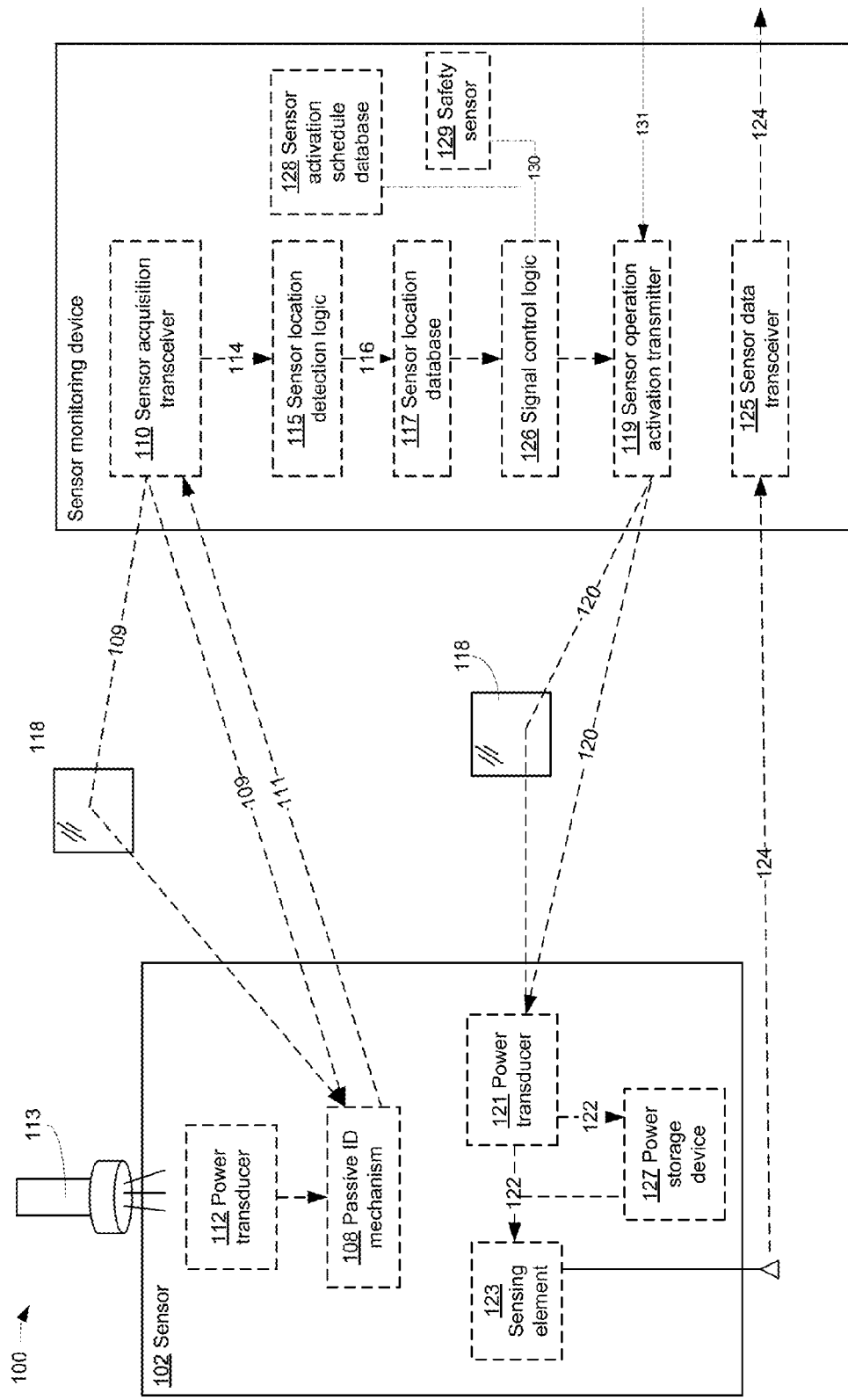
FIG. 2 shows a high-level block diagram of a system for communicating with one or more sensors in an ad-hoc sensor network.

Referring to FIG. 2, the sensor monitoring devices 103 may be configured to scan (e.g. a grid scan) the region 101 and detect the locations of one or more sensors 102 within the region 101. Such scanning capabilities allow the sensors 102 to be arbitrarily arranged about the region 101 without regard to relative orientations of the sensors 102 and the sensor monitoring devices 103 by a user having limited training with respect to operation of the ad hoc sensor system 100. Such location detection of the sensors 102 may serve to optimize communications with the sensors 102 in that communications signals may be wirelessly transmitted to and received from the sensors 102 in an at least partially targeted manner (e.g. via a configurable directional antenna) so as to avoid unnecessary power consumption associated with a full broadcast mode to portions of the region 101 not containing sensors 102. In an exemplary embodiment, a sensor 102 may include at least one passive identification mechanism 108 (e.g. a mechanism operating only in response to an environmental stimulus such as a radio frequency identification (RFID) chip, a retro-reflector, a micro electromechanical system (MEMS) device, and the like) which, upon irradiation of the sensor 102 by, for example, a sensor acquisition signal 109 wirelessly transmitted by a sensor acquisition transceiver 110 (e.g. a radio transceiver, a microwave transceiver, an infrared transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

The identification signal 111 may simply be a beacon-type signal that simply indicates the presence of a sensor 102 within the currently scanned region (e.g. where the passive identification mechanism 108 is merely a reflective surface on the sensor 102). Alternately the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

In another embodiment, the passive identification mechanism 108 may provide the identification signal 111 independent of any interaction with the sensor monitoring device 103. For example, the sensor 102 may include a transducer 112 responsive to an independent signal source 113 (e.g. a flashlight, handheld UV light, and the like). The transducer 112 may convert a signal (e.g. light) from the independent signal source 113 into power sufficient to power the passive identification mechanism 108 to generate the identification signal 111 for transmission to the sensor monitoring device 103. As such, a user tasked with affixing one or more sensors 102 about the region 101 may, at the same time, temporarily activate the passive identification mechanism 108 via the independent signal source 113 to allow for initial acquisition of the sensor 102 by the sensor monitoring device 103. It may be the case that the sensor monitoring device 103 is continually monitoring the region 101 and may detect the presence of the sensor 102 within the temporary activation of the passive identification mechanism 108 via the independent signal source 113.

The sensor monitoring device 103 may scan the region 101 in a zonal manner whereby the sensor acquisition transceiver 110 is progressively directed to various portions of the region 101 and transmits the sensor acquisition signal 109. Upon detection of a presence of a sensor 102 within a portion of the region 101 currently subject to scanning through receipt of the identification signal 111, the sensor acquisition transceiver 110 may provide a signal 114 to sensor location detection logic 115 of the sensor monitoring device 103. The sensor location detection logic 115 may, in turn, correlate the portion of the region 101 currently subject to scanning (e.g. via data associated with a current orientation of one or more control actuators and/or a directional antenna associated with the sensor acquisition transceiver 110) with a detected sensor 102 and store sensor location data 116 associated with that portion of the region 101 to a sensor location database 117. In one embodiment, the sensor acquisition transceiver 110 may scan along a first axis (e.g. an x-axis) and then scan along a second axis (e.g. a y-axis).

Further, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. The reflective surfaces 118 may be simple static structures such as mirrors or prisms. Alternately, the reflective surfaces 118 may be controllable structures (e.g. via a control signal generated by the sensor monitoring device 103) such that the physical orientation and/or electro-optical properties of a reflective surface 118 may be modified during a sensor location acquisition scan by the sensor monitoring device 103 of the portion of the region 101 including the reflective surface 118 such that the effective scanning area of the sensor monitoring device 103 may include portions of the region 101 which are otherwise restricted due to line-of-sight issues.

In an alternate embodiment, the ad hoc sensor system 100 may include at least one mobile robotic device configured to traverse the region 101 (e.g. a repurposed robotic device such as a Roomba® product manufactured by iRobot of Bedford, Mass.). The mobile robotic device may include sensor monitoring device 103 and/or a reflective surface 118 which may be targeted by another sensor monitoring device 103. The mobile robotic device may traverse the region 101 and conduct acquisition and or activation operations with respect to the sensors 102 as described above.

The sensors 102 may be configured as passive sensors with no on-board power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations. Following sensing operations by the sensing element 123, sensor data 124 may be transmitted to a sensor data transceiver 125 of the sensor monitoring device 103 which, in turn may transmit the sensor data 124 on to the processing devices 105 for further data analysis and review by a user.

The United States Federal Communications Commission (FCC) and National Telecommunications and Information Administration (NTIA) are endowed with authority to allocate and regulate various communications frequencies. Further, the FCC has established standards for exposure limits (e.g. Maximum Permissible Exposure (MPE) levels; See "Evaluating Compliance with FCC Guidelines for Human Exposure to Radiofrequency Electromagnetic Fields," Federal Communications Commission Office of Engineering & Technology, OET Bulletin 65, Edition 97-01 (August 1997)) for various frequency ranges (e.g. 0.3 to 100,000 MHz) for occupational/controlled exposure as well as general population/uncontrolled exposures. Such standards are defined in terms of electric field and magnetic field strength as well as power density. Occupational/controlled limits apply in situations in which persons are exposed as a consequence of their employment provided those persons are fully aware of the potential for exposure and can exercise control over their exposure. Limits for occupational/controlled exposure also apply in situations when an individual is transient through a location where occupational/controlled limits apply provided he or she is made aware of the potential for exposure. General population/uncontrolled exposures apply in situations in which the general public may be exposed, or in which persons that are exposed as a consequence of their employment may not be fully aware of the potential for exposure or cannot exercise control over their exposure.

Further, the FCC has adopted limits for safe exposure to radiofrequency (RF) energy. These limits are given in terms of a unit referred to as the Specific Absorption Rate (SAR), which is a measure of the amount of radio frequency energy absorbed by the body, for example, when using a mobile phone. Cell phone manufacturers are required to ensure that their phones comply with these objective limits for safe exposure. Any cell phone at or below these SAR levels (that is, any phone legally sold in the U.S.) is a "safe" phone, as measured by these standards. The FCC limit for public exposure from cellular telephones is a SAR level of 1.6 watts per kilogram (1.6 W/kg).

Still further, the United States Department of Labor's Occupational Safety & Health Administration (OSHA) has adopted limits for exposure to "ionizing radiation" (e.g. alpha rays, beta rays, gamma rays, X-rays, neutrons, high-speed electrons, high-speed protons, and other atomic particles) and "non-ionizing radiation" (e.g. sound or radio waves) but has no regulated limits for visible light, infrared or ultraviolet light.

As such, in order to facilitate the unregulated usage of the ad hoc sensor system 100 in any number of varied environments, in an exemplary embodiment, the sensor acquisition transceiver 110 and/or the sensor operation activation transmitter 119 may operate in one or more frequency and power ranges such that the sensor acquisition signal 109 and/or the sensor operation activation signal 120 are not subject to regulation by one or more entities (e.g. a government institution having jurisdictional authority for a user of the ad hoc sensor system 100 or a non-governmental institution with which a user of the ad hoc sensor system 100 is associated (e.g. contractually associated)). For example, the sensor acquisition signal 109 and/or the sensor operation activation signal 120 may be visible light, infrared, or ultraviolet light signals.

Figure 4A:
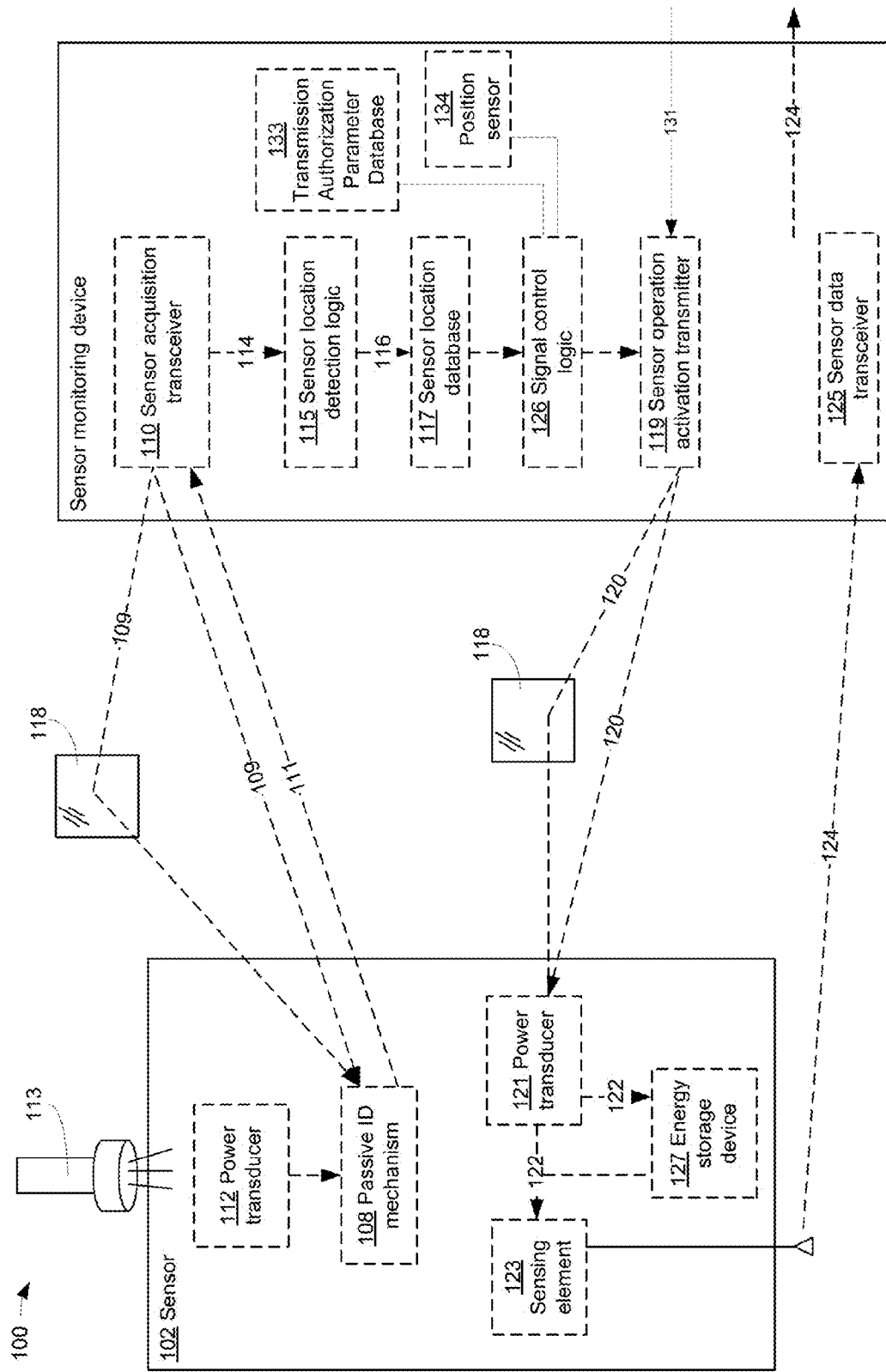
FIG. 4A shows a high-level block diagram of a system for communicating with one or more sensors in an ad-hoc sensor network.

In an exemplary embodiment, as shown in FIG. 4A, the sensor monitoring device 103 may include a transmission parameter database 133. The transmission parameter database 133 may include data associated with authorizations and/or restrictions on the transmission of sensor operation activation signal 120. For example, the transmission parameter database 133 may include global positioning data mapped to authorization data (e.g. governmental regulations established by the FCC, OSHA, and other domestic and foreign rule making authorities) regarding the characteristics or type of sensor operation activation signal 120 that may be authorized for a given location. The sensor monitoring device 103 may further include a global positioning system (GPS) sensor 134. The signal control logic 126 may query the GPS sensor 134 to determine a currently location of the sensor monitoring device 103. The signal control logic 126 may then query the transmission parameter database 133 to determine of any restrictions exist for the transmission of the sensor operation activation signal 120 at the present location of the sensor monitoring device 103. The signal control logic 126 may then set one or more signal transmission parameters (e.g. signal frequency, signal power, and the like) according to those restrictions (e.g. set the sensor operation activation signal 120 to allowable settings as determined from the transmission parameter database 133). While described in the context of a governmental regulation, the transmission parameter database 133 may maintain data associated with any transmission parameter that may be used to allow or restrict the transmission of the sensor operation activation signal 120 (e.g. a user-defined transmission parameter, and the like).

In another exemplary embodiment, the sensor operation activation transmitter 119 may include one or more laser transmitters configured to transmit the sensor operation activation signal 120 to one or more sensors 102. Due to regulatory and/or safety issues, it may be the case that the sensor operation activation transmitter 119 may further include one or more lens elements configured to at least partially defocus the laser-based sensor operation activation signal 120 emitted by the sensor operation activation transmitter 119. Alternately, a defocused laser-based sensor operation activation signal 120 may include beam components having varying focal length components. Further, the sensor operation activation transmitter 119 may be configured to produce a laser-based sensor operation activation signal 120 of moderate to high divergence such that the power density of the laser-based sensor operation activation signal 120 dissipates over a relatively short distance.

Figure 3:
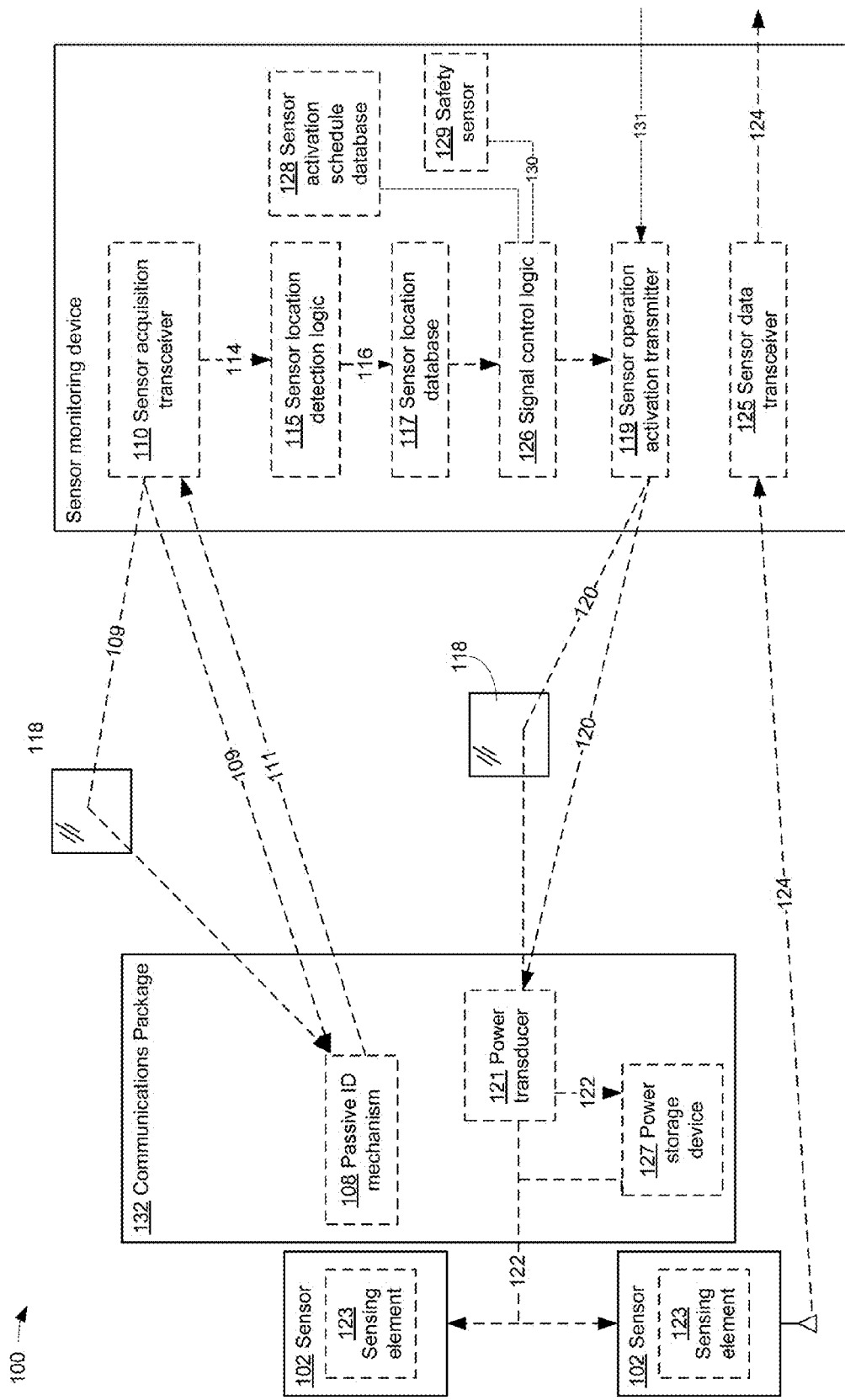
FIG. 3 shows a high-level block diagram of a system for communicating with one or more sensors in an ad-hoc sensor network.

In another exemplary embodiment, as shown in FIG. 3, a sensor 102 may include the sensing element 123 but may be independent of a communications package 132 including the passive identification mechanism 108 and/or the power transducer 121. In this manner, the communications package 132 may be operably coupled (e.g. via a Universal Serial Bus-type connection) to and provide power 122 to multiple sensors 102. Such a configuration may allow for connection of several limited-purpose sensors 102 configured for divergent sensing operations (e.g. a thermal sensor and a video capture sensor) into a single sensor package with a common communications package 132 configured for receiving power via a common sensor operation activation signal 120.

In an exemplary embodiment, signal control logic 126 of the sensor monitoring devices 103 may obtain sensor location data 116 from previous sensor acquisitions. The signal control logic 126 may query the sensor location database 117 for the location of at least one sensor 102 and provide control signals to the sensor acquisition transceiver 110 to direct the sensor operation activation signal 120 in the direction of the at least one sensor 102 (e.g. via configuring one or more actuators or a directional antennal array). The signal control logic 126 may cycle through the detected inventory of sensors 102 and configure the sensor operation activation transmitter 119 to transmit the sensor operation activation signal 120 in the direction of a given sensor 102 during a given time interval associated with that sensor 102 before moving on to transmissions to additional sensors 102. It may be the case that the sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to cache sensor data over a period of days or weeks. As such, a sensor 102 may include an energy storage device 127 (e.g. a capacitor, a battery, and the like) chargeable by the power 122 generated by the power transducer 121 in response to the sensor operation activation signal 120. The power stored by the energy storage device 127 may be surplus power provided during irradiation of the power transducer 121 by the sensor operation activation transmitter 119 that is not required for sensing operations of the sensing element 123 during that time period. The power stored by the energy storage device 127 may then be used for sensing operations of the sensing element 123 during time periods where the sensor operation activation transmitter 119 is not currently irradiating the power transducer 121. Power-intensive sensor operations such as cached sensor data transmission from the sensor 102 to the sensor monitoring device 103 may only occur intermittently when the additional power provided by the sensor operation activation signal 120 is provided to the sensor 102.

In another exemplary embodiment, the ongoing sensor operations of a sensor 102 may have power requirements such that ongoing transmission of the sensor operation activation signal 120 is required. For example, for real-time audio or video sensing, the sensor operation activation signal 120 may be transmitted in a continuous manner to one or more sensors 102.

In another exemplary embodiment, the transmission of the sensor operation activation signal 120 to a sensor 102 by the sensor operation activation transmitter 119 may be conducted according to a schedule. For example, it may be the case that the sensor operation activation signal 120 may be a high-power signal (e.g. a high-power optical, ultraviolet, or x-ray beam). It may be undesirable to transmit the sensor operation activation signal 120 having such high-power characteristics into a region 101 containing sensitive items 104 and or personnel. As such, the sensor monitoring devices 103 may include a sensor activation schedule database 128. The sensor activation schedule database 128 may include scheduling data associated with authorized time periods when a high-power sensor operation activation signal 120 may be provided to the sensor 102 to initiate and/or power various sensor operations. For example, it may be desirable to activate the high-power sensor operation activation signal 120 at a time when personnel will generally be absent from the region 101 or when certain sensitive items 104 (e.g. biological matter, volatile chemical compositions) are not scheduled to be within the region 101 (e.g. during the night when a facility including the region 101 is closed). The signal control logic 126 may query the sensor activation schedule database 128 to retrieve scheduling data from the sensor activation schedule database 128 and activate the sensor operation activation transmitter 119 according to that schedule.

Figure 4B:
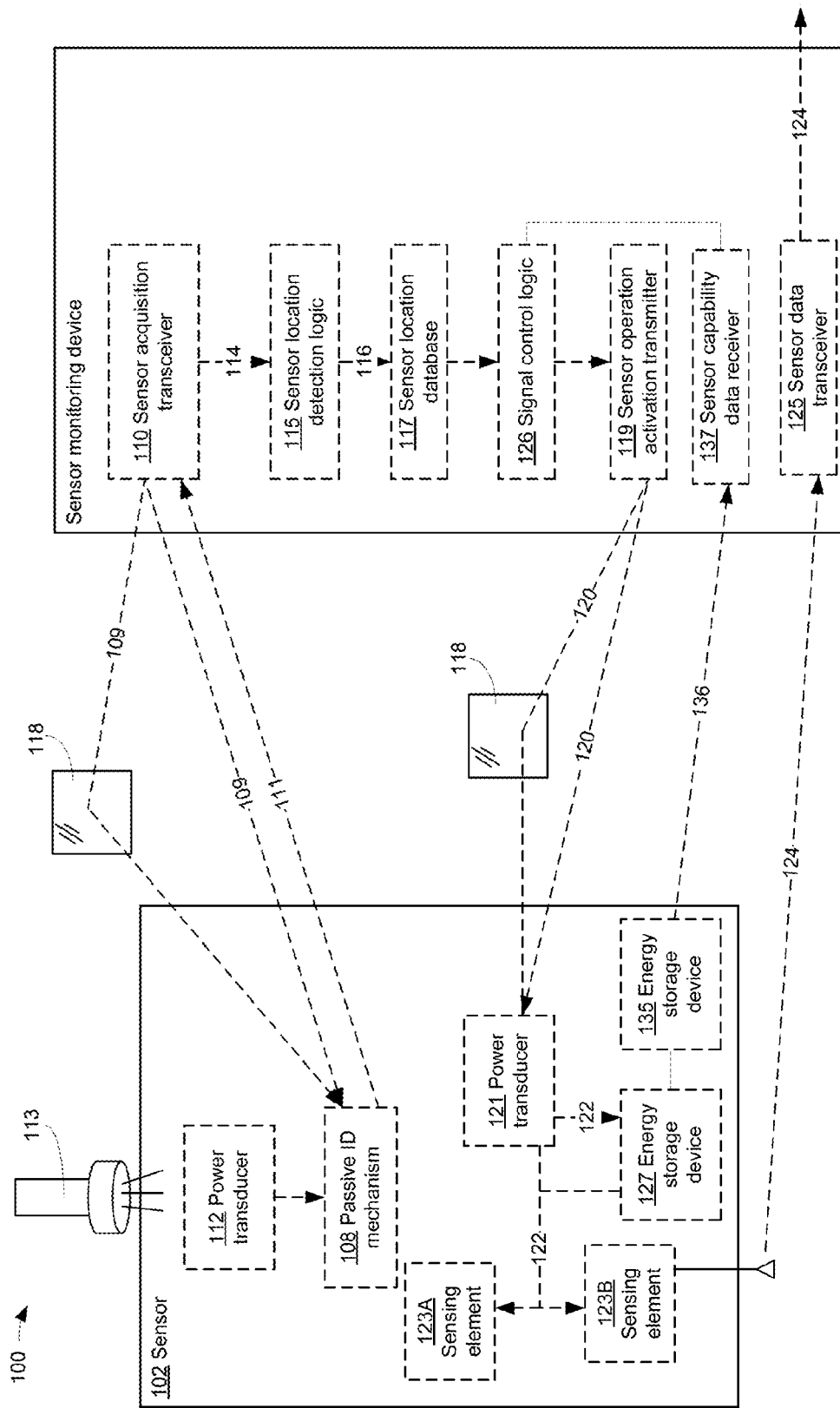
FIG. 4B shows a high-level block diagram of a system for communicating with one or more sensors in an ad-hoc sensor network.

Referring to FIG. 4B, in another exemplary embodiment, a sensor 102 may include an energy storage monitoring unit 135. The energy storage monitoring unit 135 may monitor one or more energy storage parameters (e.g. energy density, voltage capacity, current capacity, and the like) of the energy storage device 127. It may be the case that the sensor 102 may include two or more sensing elements 123 configured for different sensing operations. For example, a sensor 102 may include a sensing element 123A configured for power-intensive sensing operations (e.g. full-motion color video capture) and a sensing element 123B configured less power-intensive sensing operations (e.g. simple audio capture). As such, it may be the case that the energy storage device 127 may currently have sufficient stored energy for performing sensing operations with the sensing element 123B but may not have sufficient stored energy for performing sensing operations with the sensing element 123A. The energy storage monitoring unit 135 may compare one or more energy storage parameters of the energy storage device 127 to one or more threshold energy usage parameters associated with the sensing operations of the sensing element 123A and/or the sensing element 123B to determine whether or not sufficient power is available for the sensing element 123A and/or the sensing element 123B. The energy storage monitoring unit 135 may transmit sensor capability data 136 indicative of an energy storage parameter and/or a comparison of the energy storage parameter to a threshold energy usage parameter (e.g. a notification that the sensor 102 is "in network" or "out of network" for a given sensing operation) which may be received by a sensor capability data receiver 137 of the sensor monitoring device 103. Depending on the required availability of the sensing operations of the sensing element 123A and/or the sensing element 123B as indicated by the sensor capability data 136 received by the sensor capability data receiver 137, the signal control logic 126 may cause the sensor operation activation transmitter 119 to transmit a sensor operation activation signal 120 to the sensor 102 to directly power the sensing element 123A and/or the sensing element 123B and/or charge the energy storage device 127 to facilitate continued operations of the sensing element 123. The transmission of the sensor capability data 136 by the energy storage monitoring unit 135 may be in response to a sensing operation request by a sensor monitoring device 103. For example, the sensor monitoring device 103 may request that a sensor 102 perform a specific sensing operation (e.g. full-motion color video capture) and transmit sensor data 124 accordingly. In response to that request, the energy storage monitoring unit 135 may query the energy storage device 127 and provide the sensor capability data 136 (e.g. a notification that insufficient power is currently stored) for that particular sensing operation according to the current energy storage status of the energy storage device 127. In another exemplary embodiment, the sensing operations of a sensing element 123 may be reconfigured according to an energy storage parameter of the energy storage device 127. For example, it may be the case that a sensing element 123 may be presently configured for full-motion color video capture sensing operations. However, it may be the case that the energy storage monitoring unit 135 may detect that the energy storage device 127 lacks sufficient energy density to properly carry out such power-intensive sensing operations. As such, the energy storage monitoring unit 135 may provide one or more configuration signals 138 to a sensing element 123 to reconfigure the sensing element 123 to operate in a less power-intensive mode (e.g. in a grayscale periodic image capture mode). Following recharging of the energy storage device 127 by the sensor operation activation signal 120, the energy storage monitoring unit 135 may provide one or more configuration signals 138 to the sensing element 123 to reconfigure the sensing element 123 to once again operate in a more power-intensive mode.

Further, in another exemplary embodiment, the sensor operation activation transmitter 119 may be controlled by an external control signal 129. The external control signal 129 may be provided to the sensor monitoring device 103 by the one or more processing devices 105 (e.g. a cell phone, tablet computer, laptop computer, and the like) external to the at the sensor monitoring device 103 at the direction of a user 107. Alternately, as described above, the sensor monitoring devices 103 may be pluggable with respect to one or more standard environmental devices (e.g. a standard 110-volt wall outlet-pluggable sensor monitoring device 103A, a standard 60-watt light socket-pluggable sensor monitoring device 103B, and the like). It may be the case that a wall outlet and/or light socket may be controllable by a switch (e.g. a standard wall-mounted light switch) as would be the case for a standard appliance or light bulb coupled to the wall outlet and/or light socket. The sensor monitoring devices 103 may be likewise be configured such that the same switch may control the sensor monitoring devices 103 to power on the sensor operation activation transmitter 119 when the switch is actuated by a user.

Further, in another exemplary embodiment, one or more safety features may be employed by the ad hoc sensor system 100 in an attempt to ensure that a high-power sensor operation activation signal 120 is not activated when the personnel or certain sensitive items 104 (e.g. biological matter, volatile chemical compositions) are within the region 101. For example, a sensor monitoring device 103 may further include at least one safety sensor 130. The safety sensor 130 may serve to determine if one on more specified objects (e.g. personnel, biological matter, volatile chemical compositions, and the like) are present within the region 101. In the case where the safety sensor 130 detects the presence of a specified object, the safety sensor 130 may provide a notification signal 131 to the signal control logic 126. In response to the notification signal 131, the signal control logic 126 may restrict an otherwise scheduled transmission of the high-power sensor operation activation signal 120 into the region 101. The safety sensor 130 may include one or more of a motion sensor (e.g. detecting movement of a person within the region 101), an image capture sensor operably coupled to image recognition logic (e.g. detecting an image of a person or object within the region 101), an RF sensor (e.g. detecting an RFID chip associated with an identification badge of a person or object within the region 101), and the like.

In another exemplary embodiment, the sensor 102 may not employ the energy storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

In another exemplary embodiment, a sensing element 123 may include at least one passive (e.g. operating only in response to an environmental stimulus) sensing element. For example, the sensing element 123 may include a MEMS device which may be responsive to environmental conditions such as temperature, pressure, humidity, and the like. Upon irradiation of the sensor 102 by a sensor operation activation signal 120 wirelessly transmitted by the sensor operation activation transmitter 119 (e.g. optical/laser transceiver, and the like) of the sensor monitoring device 103, may receive the sensor operation activation signal 120, modulate that sensor operation activation signal 120 according to the environmental conditions and retransmit the modulated sensor operation activation signal 120 as the sensor data 124.

Figure 5:
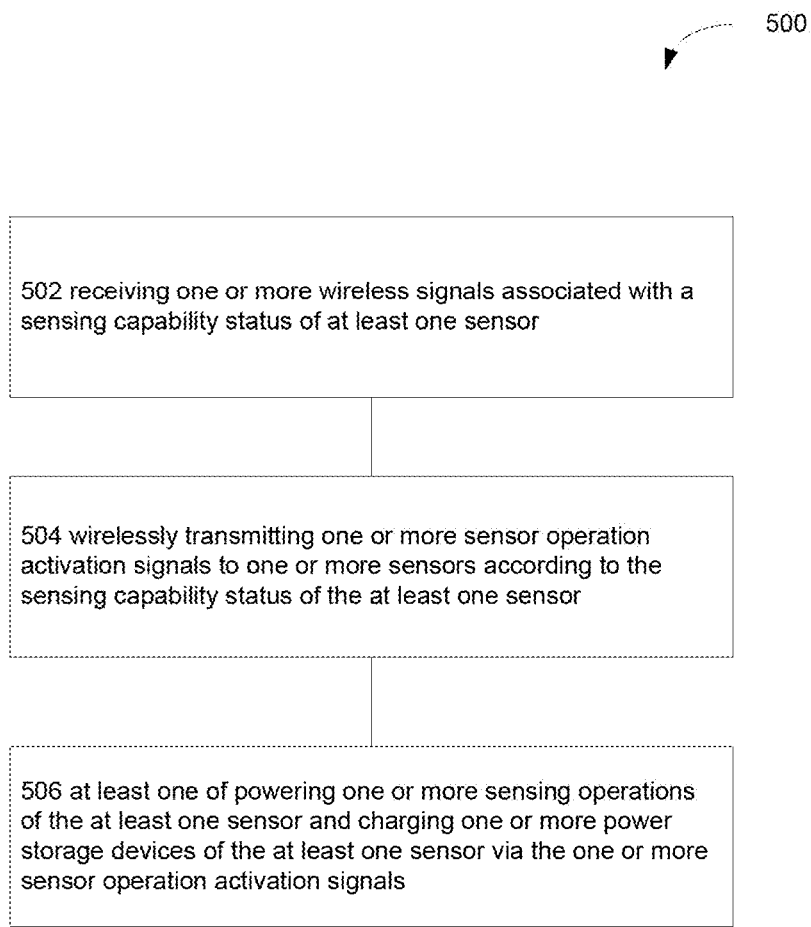
FIGS. 5-21 show operations for communicating with one or more sensors in an ad-hoc sensor network.

FIG. 5 and the following figures include various examples of operational flows, discussions and explanations may be provided with respect to the above-described exemplary environment of FIGS. 1-4B. However, it should be understood that the operational flows may be executed in a number of other environments and contexts, and/or in modified versions of FIGS. 1-4B. In addition, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

FIG. 5 illustrates an operational procedure 500 for practicing aspects of the present disclosure including operations 502, 504 and/or 506.

Operation 502 illustrates receiving one or more wireless signals associated with a sensing capability status of at least one sensor. For example, as shown in FIG. 4B, a sensor 102 may include an energy storage monitoring unit 135. The energy storage monitoring unit 135 may monitor one or more energy storage parameters (e.g. energy density, voltage capacity, current capacity, and the like) of the energy storage device 127. It may be the case that the energy storage device 127 may or may not have sufficient stored energy for performing sensing operations with a sensing element 123. The energy storage monitoring unit 135 may compare one or more energy storage parameters of the energy storage device 127 to one or more threshold energy usage parameters associated with the sensing operations of the sensing element 123 to determine whether or not the sufficient power is available for the sensing element 123A and/or the sensing element 123B. The energy storage monitoring unit 135 may transmit sensor capability data 136 indicative of an energy storage parameter and/or a comparison of the energy storage parameter to a threshold energy usage parameter (e.g. a notification that the sensor 102 is "in network" or "out of network" for a given sensing operation) which may be received by a sensor capability data receiver 137 of the sensor monitoring device 103.

Operation 504 illustrates wirelessly transmitting one or more sensor operation activation signals to one or more sensors according to the sensing capability status of the at least one sensor. For example, as shown in FIGS. 1-2, the sensors 102 may be configured as passive sensors with no external power source for conducting sensing (e.g. thermal, pressure, motion, image, audio, electromagnetic, and the like) operations. As such, the sensor monitoring device 103 may include a sensor operation activation transmitter 119 having a relatively higher power signal (e.g. as compared to the power requirements of the sensor acquisition signal 109 of the sensor acquisition transceiver 110) configured for wirelessly transmitting a sensor operation activation signal 120 (e.g. an infrared, optical, ultraviolet, x-ray beam, and the like) to the sensors 102. The signal control logic 126 may direct the sensor acquisition transceiver 110 in the direction of the at least one sensor 102 (e.g. via configuring one or more actuators or a directional antenna array) according to location of at least one sensor 102 obtained from the sensor location database 117 and transmit the sensor operation activation signal 120. Depending on the required availability of the sensing operations of a sensing element 123 as indicated by the sensor capability data 136 received by the sensor capability data receiver 137, the signal control logic 126 may cause the sensor operation activation transmitter 119 to transmit a sensor operation activation signal 120 to the sensor 102 to directly power the sensing element 123 and/or charge the energy storage device 127 to facilitate continued operations of the sensing element 123.

Operation 506 illustrates at least one of powering one or more sensing operations of the at least one sensor and charging one or more power storage devices of the at least one sensor via the one or more sensor operation activation signals. For example, as shown in FIGS. 1-4, the sensors 102 may be configured as passive sensors with no independent power source for conducting sensing (e.g. thermal, pressure, motion, image, audio, electromagnetic, and the like) operations. As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired sensing operations.

Figure 6:
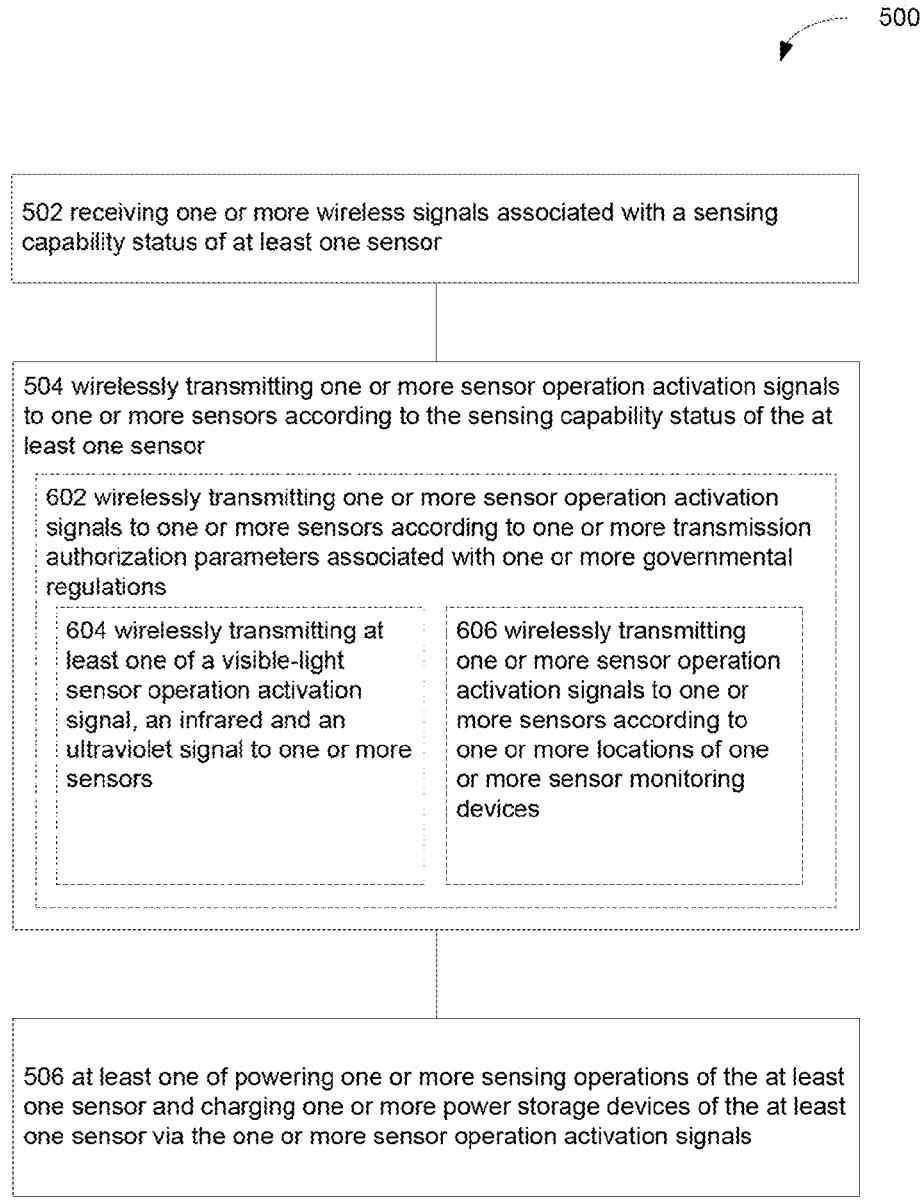

FIG. 6 further illustrates an operational procedure wherein operation 502 of operational flow 500 of FIG. 5 may include one or more additional operations. Additional operations may include operations 602 and/or 604.

Operation 602 illustrates receiving one or more wireless signals associated with an energy density status of the power storage device of at least one sensor. For example, as shown in FIG. 4B, a sensor 102 may include an energy storage monitoring unit 135. The energy storage monitoring unit 135 may monitor the energy density of the energy storage device 127. It may be the case that the energy storage device 127 may or may not have sufficient stored energy for performing sensing operations with a sensing element 123. The energy storage monitoring unit 135 may compare one or more energy storage parameters of the energy storage device 127 to one or more threshold energy usage parameters associated with the sensing operations of the sensing element 123 to determine whether or not the sufficient power is available for the sensing element 123A and/or the sensing element 123B. The energy storage monitoring unit 135 may transmit sensor capability data 136 indicative of an energy storage parameter and/or a comparison of the energy storage parameter to a threshold energy usage parameter (e.g. a notification that the sensor 102 is "in network" or "out of network" for a given sensing operation) which may be received by a sensor capability data receiver 137 of the sensor monitoring device 103.

Operation 604 illustrates receiving one or more wireless signals associated with a capability to perform a first sensing operation and an inability to perform a second sensing operation. For example, as shown in FIG. 4B, a sensor 102 may include an energy storage monitoring unit 135. The energy storage monitoring unit 135 may monitor one or more energy storage parameters (e.g. energy density, voltage capacity, current capacity, and the like) of the energy storage device 127. It may be the case that the sensor 102 may include two or more sensing elements 123 configured for different sensing operations. For example, a sensor 102 may include a sensing element 123A configured for power-intensive sensing operations (e.g. full-motion color video capture) and a sensing element 123B configured less power-intensive sensing operations (e.g. simple audio capture). As such, it may be the case that the energy storage device 127 may currently have sufficient stored energy for performing sensing operations with the sensing element 123B but may not have sufficient stored energy for performing sensing operations with the sensing element 123A. The energy storage monitoring unit 135 may compare one or more energy storage parameters of the energy storage device 127 to one or more threshold energy usage parameters associated with the sensing operations of the sensing element 123A and/or the sensing element 123B to determine whether or not sufficient power is available for the sensing element 123A and/or the sensing element 123B. The energy storage monitoring unit 135 may transmit sensor capability data 136 indicative of an energy storage parameter and/or a comparison of the energy storage parameter to a threshold energy usage parameter (e.g. a notification that the sensor 102 is "in network" or "out of network" for a given sensing operation) which may be received by a sensor capability data receiver 137 of the sensor monitoring device 103.

Figure 7:
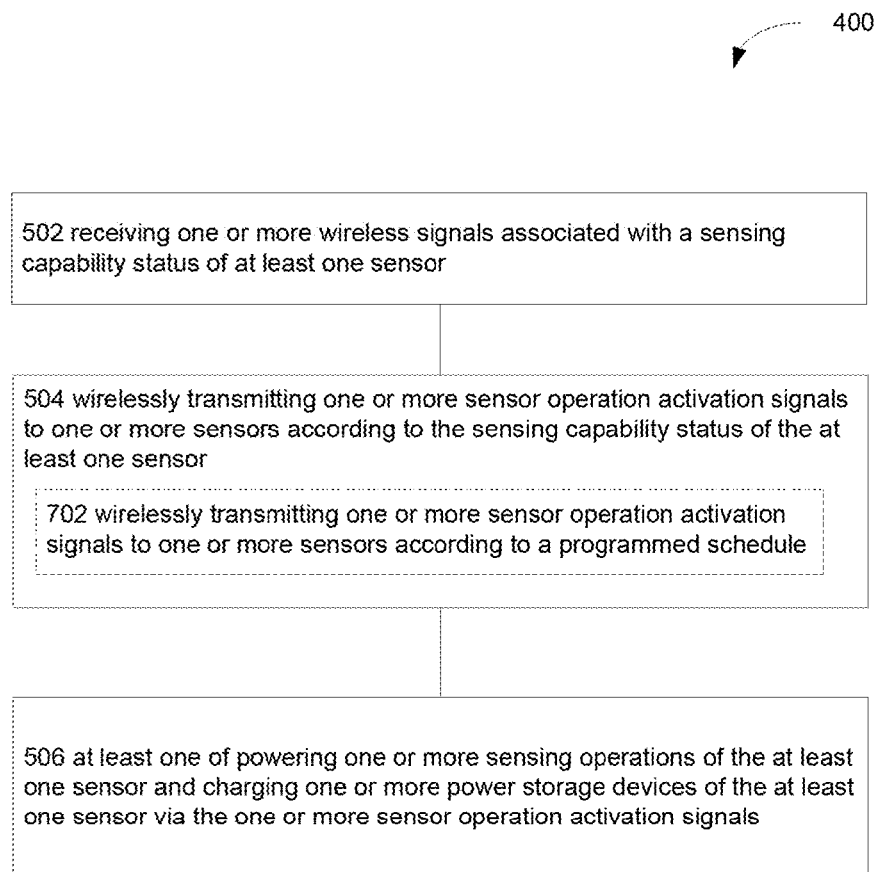

FIG. 7 further illustrates an operational procedure wherein operation 502 of operational flow 500 of FIG. 5 may include one or more additional operations. Additional operations may include operation 702.

Operation 702 illustrates wirelessly transmitting one or more sensor operation activation signals to one or more sensors according to a programmed schedule. For example, as shown in FIGS. 1-3, the transmission of the sensor operation activation signal 120 to a sensor 102 by the sensor operation activation transmitter 119 may be conducted according to a schedule. For example, it may be the case that the sensor operation activation signal 120 may be a high-power signal (e.g. a high-power optical, ultraviolet, or x-ray beam). It may be undesirable to transmit the sensor operation activation signal 120 having such high-power characteristics into a region 101 containing sensitive items 104 and or personnel. As such, the sensor monitoring devices 103 may include a sensor activation schedule database 128. The sensor activation schedule database 128 may include scheduling data associated with authorized time periods when a high-power sensor operation activation signal 120 may be provided to the sensor 102 to initiate and/or power various sensor operations. For example, it may be desirable to activate the high-power sensor operation activation signal 120 at a time when personnel will generally be absent from the region 101 or when certain sensitive items 104 (e.g. biological matter, volatile chemical compositions) are not scheduled to be within the region 101 (e.g. during the night when a facility including the region 101 is closed). The signal control logic 126 may query the sensor activation schedule database 128 to retrieve scheduling data from the sensor activation schedule database 128 and activate the sensor operation activation transmitter 119 according to that schedule.

Figure 8:
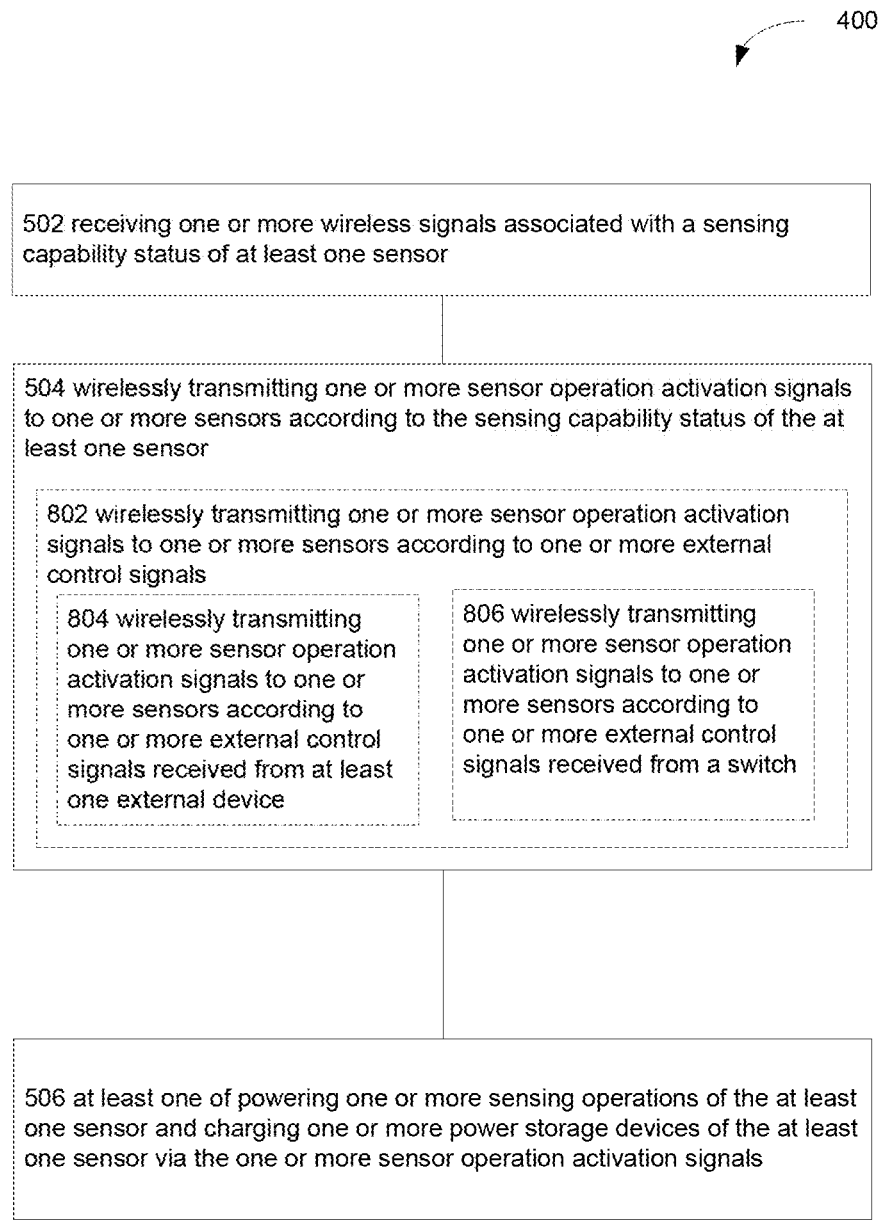

FIG. 8 further illustrates an operational procedure wherein operation 802 of operational flow 500 of FIG. 5 may include one or more additional operations. Additional operations may include operations 802, 804 and/or 806.

Operation 802 illustrates wirelessly transmitting one or more sensor operation activation signals to one or more sensors according to one or more external control signals. For example, as shown in FIGS. 1-3, the sensor operation activation transmitter 119 may be controlled by an external control signal 129 (e.g. a signal not originating from the sensor monitoring device 103).

Operation 804 illustrates wirelessly transmitting one or more sensor operation activation signals to one or more sensors according to one or more external control signals received from at least one external device. For example, as shown in FIGS. 1-3, an external control signal 129 may be provided to the sensor monitoring device 103 by one or more processing devices 105 (e.g. a cell phone, tablet computer, laptop computer, and the like) external to the at the sensor monitoring device 103 at the direction of a user 107.

Operation 806 illustrates wirelessly transmitting one or more sensor operation activation signals to one or more sensors according to one or more external control signals received from one or more switches. For example, as shown in FIGS. 1-3, the sensor monitoring devices 103 may be pluggable with respect to one or more standard environmental devices (e.g. a standard 110-volt wall outlet-pluggable sensor monitoring device 103A, a standard 60-watt light socket-pluggable sensor monitoring device 103B, and the like). It may be the case that a wall outlet and/or light socket may be controllable by a switch (e.g. a standard wall-mounted light switch) as would be the case for a standard appliance or light bulb coupled to the wall outlet and/or light socket. The sensor monitoring devices 103 may be likewise be configured such that the same switch may control the sensor monitoring devices 103 to power on the sensor operation activation transmitter 119 when the switch is actuated by a user.

Figure 9:
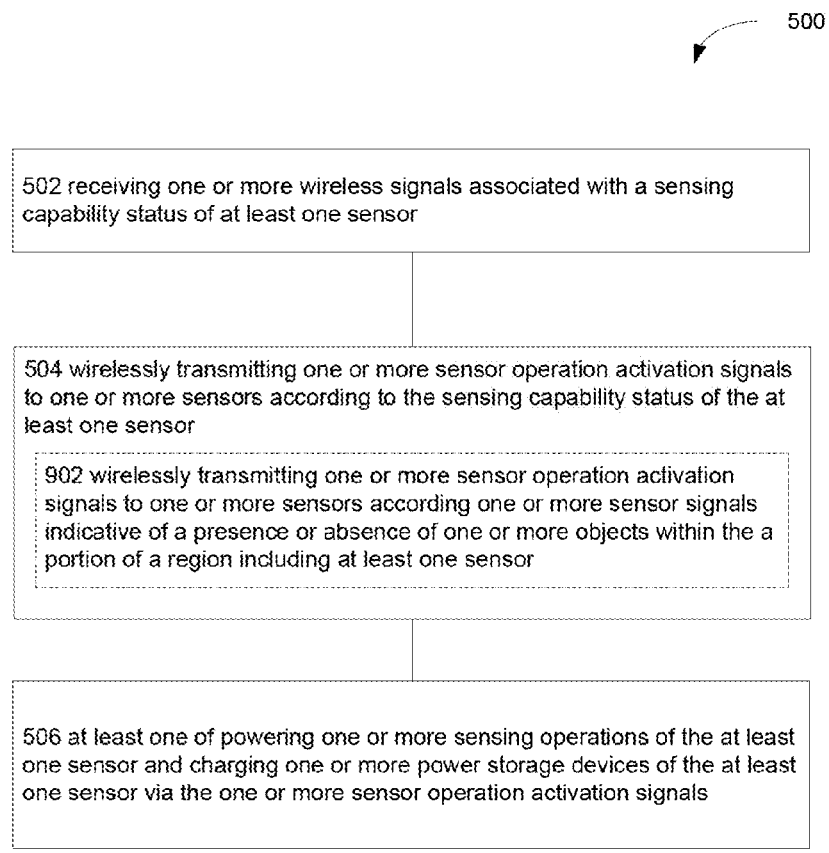
Figure 10:
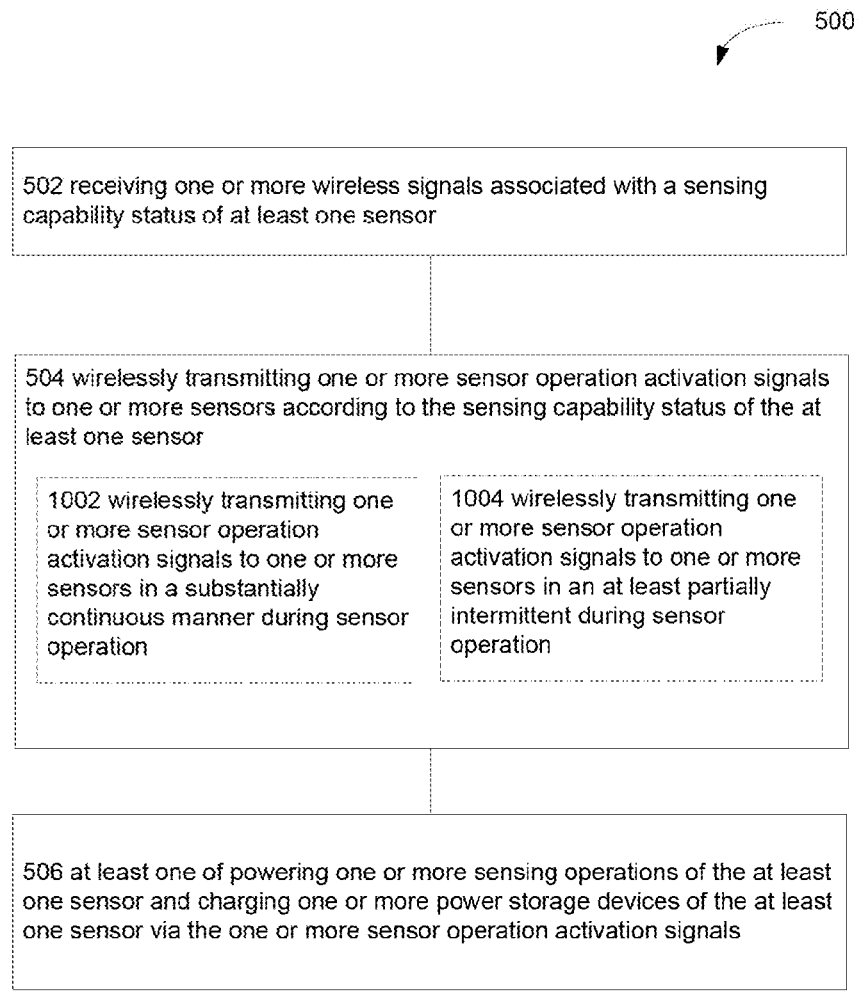

FIG. 9 further illustrates an operational procedure wherein operation 502 of operational flow 500 of FIG. 5 may include one or more additional operations. Additional operations may include operation 902.

Operation 902 illustrates wirelessly transmitting one or more sensor operation activation signals to one or more sensors according one or more sensor signals indicative of a presence or absence of one or more objects within the portion of a region including at least one sensor. For example, as shown in FIGS. 1-3, one or more safety features may be employed by the ad hoc sensor system 100 in an attempt to ensure that a high-power sensor operation activation signal 120 is not activated when the personnel or certain sensitive items 104 (e.g. biological matter, volatile chemical compositions) are within the region 101. For example, a sensor monitoring device 103 may further include at least one safety sensor 132. The safety sensor 130 may serve to determine if one on more specified objects (e.g. personnel, biological matter, volatile chemical compositions, and the like) are present within the region 101. In the case where the safety sensor 130 detects the presence of a specified object, the safety sensor 130 may provide a notification signal 133 to the signal control logic 126. In response to the notification signal 131, the signal control logic 126 may restrict an otherwise scheduled transmission of the high-power sensor operation activation signal 120 into the region 101. The safety sensor 130 may include one or more of a motion sensor (e.g. detecting movement of a person within the region 101), an image capture sensor operably coupled to image recognition logic (e.g. detecting an image of a person or object within the region 101), an RF sensor (e.g. detecting an RFID chip associated with an identification badge of a person or object within the region 101), and the like.

Figure 11:
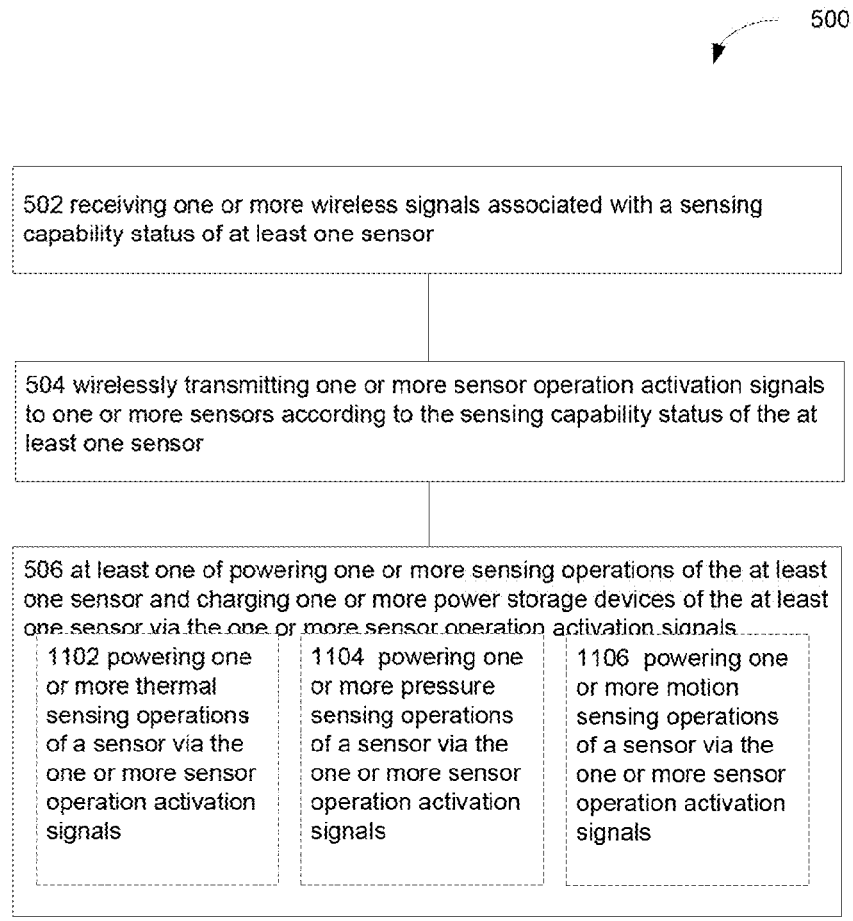

FIG. 11 further illustrates an operational procedure wherein operation 504 of operational flow 500 of FIG. 5 may include one or more additional operations. Additional operations may include operations 1102, 1104 and/or 1106.

Operation 1102 illustrates powering one or more thermal sensing operations of a sensor via the one or more sensor operation activation signals. For example, as shown in FIGS. 1-4, the sensors 102 may be configured as passive sensors with no independent power source for conducting thermal sensing operations by an thermal sensing element 123 (e.g. a thermo-resistor). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired thermal sensing operations.

Operation 1104 illustrates powering one or more pressure sensing operations of a sensor via the one or more sensor operation activation signals. For example, as shown in FIGS. 1-4, the sensors 102 may be configured as passive sensors with no independent power source for conducting pressure sensing operations by an pressure sensing element 123 (e.g. a piezoelectric pressure sensor). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired pressure sensing operations.

Operation 1106 illustrates powering one or more motion sensing operations of a sensor via the one or more sensor operation activation signals. For example, as shown in FIGS. 1-4, the sensors 102 may be configured as passive sensors with no independent power source for conducting motion sensing operations by a motion sensing element 123 (e.g. a camera, thermal sensor, pressure sensor, radar sensor, and the like). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired motion sensing operations.

Figure 12:
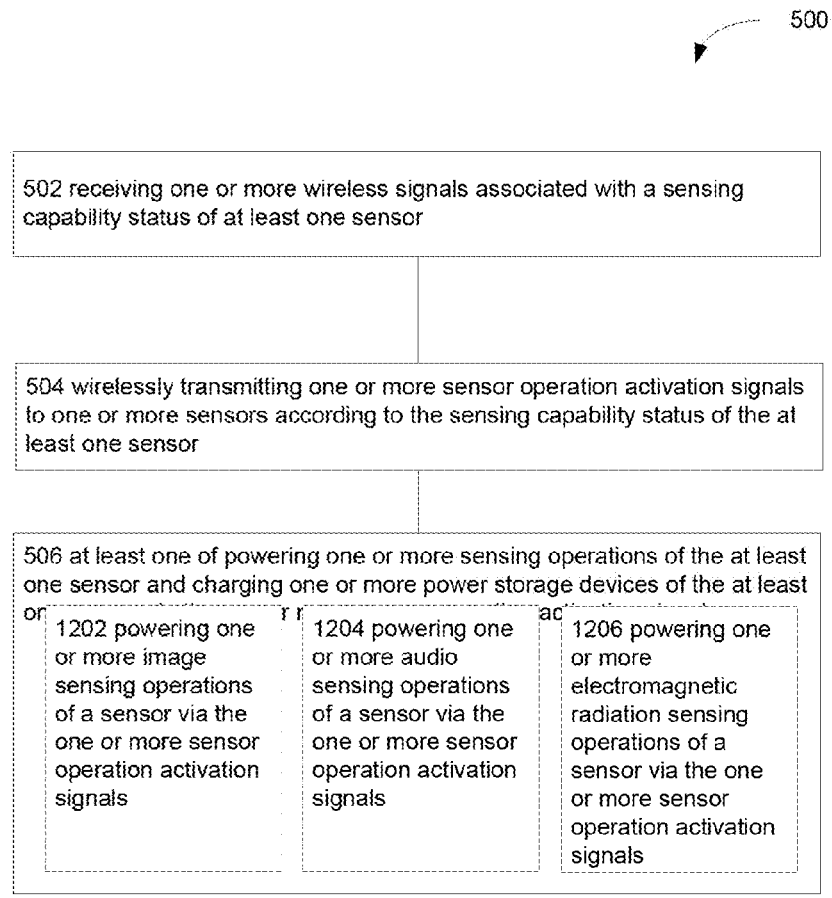

FIG. 12 illustrates an operational procedure wherein operation 504 of operational flow 500 of FIG. 5 may include one or more additional operations. Additional operations may include operations 1202, 1204 and/or 1206.

Operation 1202 illustrates powering one or more image sensing operations of a sensor via the one or more sensor operation activation signals. For example, as shown in FIGS. 1-4, the sensors 102 may be configured as passive sensors with no on-board power source for conducting image sensing operations by an image capture sensing element 123 (e.g. a still or video camera). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired image sensing operations.

Operation 1204 illustrates powering one or more audio sensing operations of a sensor via the one or more sensor operation activation signals. For example, as shown in FIGS. 1-4, the sensors 102 may be configured as passive sensors with no on-board power source for conducting audio sensing operations by an audio sensing element 123 (e.g. a microphone). As such, the sensor monitoring device 103 may include a sensor operation activation transmitter 119 having a relatively higher power signal configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired audio sensing operations.

Operation 1206 illustrates powering one or more electromagnetic radiation sensing operations of a sensor via the one or more sensor operation activation signals. For example, as shown in FIGS. 1-4, the sensors 102 may be configured as passive sensors with no on-board power source for conducting electromagnetic radiation (EMR) sensing operations by an EMR sensing element 123. As such, the sensor monitoring device 103 may include a sensor operation activation transmitter 119 having a relatively higher power configured for wirelessly transmitting a sensor operation activation signal 120 (e.g. an infrared, optical, ultraviolet, x-ray beam, and the like) to the sensors 102. The sensors 102 may include a power transducer 121 configured to convert the sensor operation activation signal 120 into electrical or optical power 122 usable by sensing element 123 (e.g. electrical circuitry, micro-electromechanical system devices, and the like) configured to carry out the desired EMR sensing operations.

Figure 13:
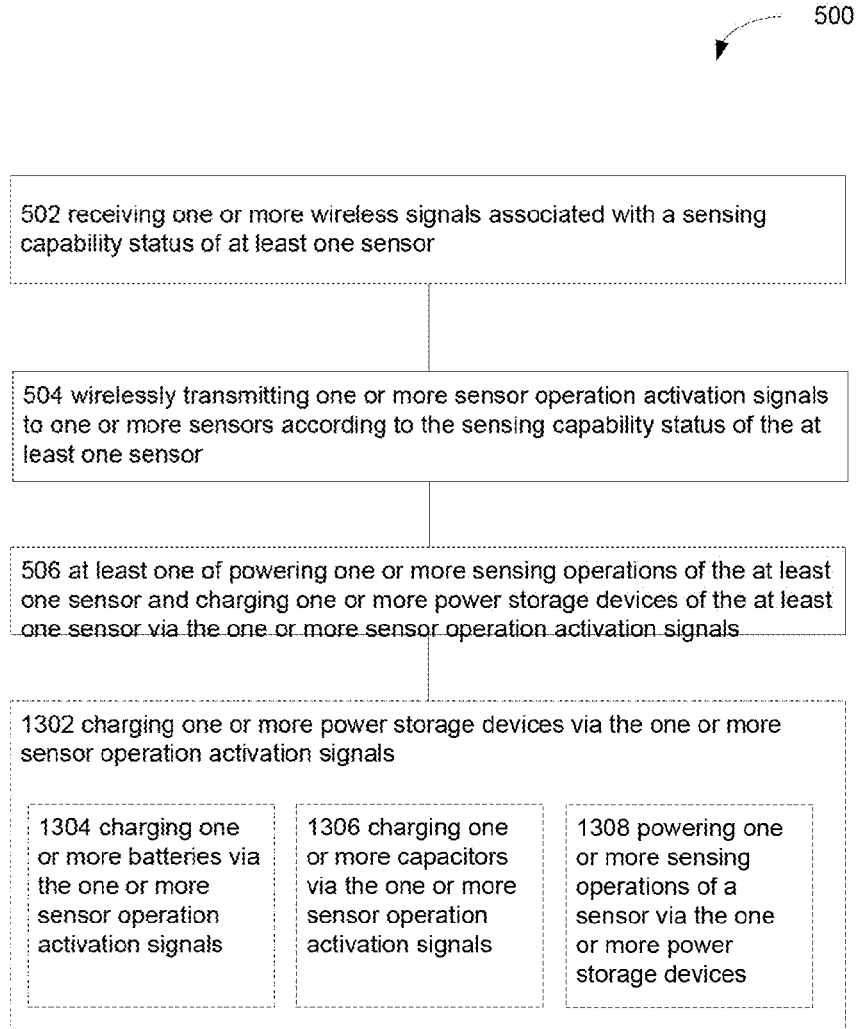

FIG. 13 illustrates an operational procedure wherein operational flow 500 of FIG. 5 may include one or more additional operations. Additional operations may include operation 1203.

Operation 1302 illustrates charging one or more power storage devices of the at least one sensor. For example, as shown in FIGS. 1-4, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include an energy storage device 127 (e.g. a capacitor, a battery, and the like) chargeable by the power 122 generated by the power transducer 121 in response to the sensor operation activation signal 120.

FIG. 13 further illustrates an operational procedure wherein operation 1302 of operational flow 500 of FIG. 13 may include one or more additional operations. Additional operations may include operations 1304, 1306 and/or 1308.

Operation 1304 illustrates charging one or more batteries via the one or more sensor operation activation signals. For example, as shown in FIGS. 1-4, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include one or more batteries chargeable by the power 122 generated by the power transducer 121 in response to the sensor operation activation signal 120.

Operation 1306 illustrates charging one or more capacitors via the one or more sensor operation activation signals. For example, as shown in FIGS. 1-4, it may be the case that sensor operations may be on a time scale greater than a power acquisition time interval for a given sensor 102. For example, it may be the case that the sensor monitoring device 103 may only be capable of dedicating minutes or hours to transmitting a sensor operation activation signal 120 to a given sensor 102 particular for power-intensive sensor operations such as cached sensor data transmission from the sensor 102 to the sensor monitoring device 103. However, it may be desirable for an image capture sensor 102 (e.g. a still or video image capture sensor 102) may operate in a low-power mode to record sensor data over a period of days or weeks. As such, a sensor 102 may include one or more capacitors chargeable by the power 122 generated by the power transducer 121 in response to the sensor operation activation signal 120.

Operation 1308 illustrates powering one or more sensing operations of a sensor via the one or more power storage devices. The power stored by the energy storage device 127 may then be used for sensing operations of the sensing element 123 during time periods where the sensor operation activation transmitter 119 is not currently irradiating the power transducer 121.

Figure 14:
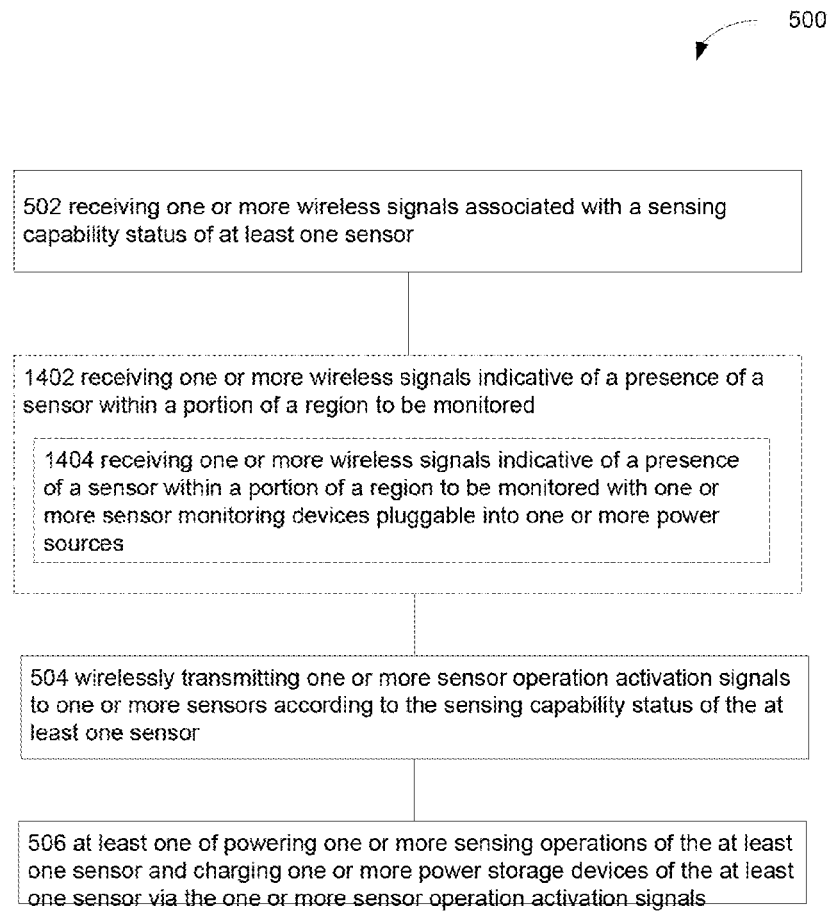

FIG. 14 illustrates an operational procedure wherein operational flow 500 of FIG. 5 may include one or more additional operations. Additional operations may include operation 1402.

Operation 1402 illustrates receiving one or more wireless signals indicative of a presence of a sensor within a portion of a region to be monitored. For example, as shown in FIGS. 1-4, the sensor monitoring devices 103 may be configured to scan (e.g. a grid scan) the region 101 and detect the locations of one or more sensors 102 within the region 101. Such scanning capabilities allow the sensors 102 to be arbitrarily arranged about the region 101 without regard to relative orientations of the sensors 102 and the sensor monitoring devices 103 by a user having limited training with respect to operation of the ad hoc sensor system 100. Such location detection of the sensors 102 may serve to optimize communications with the sensors 102 in that communications signals may be wirelessly transmitted to and received from the sensors 102 in an at least partially targeted manner (e.g. via a configurable directional antenna) so as to avoid unnecessary power consumption associated with a full broadcast mode to portions of the region 101 not containing sensors 102. In an exemplary embodiment, a sensors 102 may include at least one passive identification mechanism 108 (e.g. a mechanism operating only in response to an environmental stimulus such as a radio frequency identification (RFID) chip, a retro-reflector, a micro electromechanical system (MEMS) device, and the like) which, upon irradiation of the sensor 102 by, for example, a sensor acquisition signal 109 wirelessly transmitted by a sensor acquisition transceiver 110 (e.g. a radio transceiver, an optical/laser transceiver, and the like) of a sensor monitoring device 103, the sensor 102 may, in turn, wirelessly transmit an identification signal 111 indicative of the presence of the sensor 102 within the region 101 which may be received by the sensor acquisition transceiver 110 of the sensor monitoring device 103.

The received identification signal 111 may simply be a beacon-type signal that simply indicates the presence of a sensor 102 within the currently scanned region (e.g. where the passive identification mechanism 108 is merely a reflective surface on the sensor 102). Alternately the received identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

FIG. 14 further illustrates an operational procedure wherein operation 1402 of operational flow 500 of FIG. 14 may include one or more additional operations. Additional operations may include operation 1404.

Operation 1404 illustrates receiving one or more wireless signals indicative of a presence of a sensor within a portion of a region to be monitored with one or more sensor monitoring devices pluggable into one or more power sources. For example, as shown in FIG. 1, the sensor monitoring devices 103 may be configured as one or more standard environmental devices (e.g. a wall outlet-pluggable sensor monitoring device 103A, a light socket-pluggable sensor monitoring device 103B, and the like) such that the region 101 may be easily retrofitted to employ the ad hoc sensor system 100 by incorporating the sensor monitoring devices 103 into pre-existing power supplies.

Figure 15:
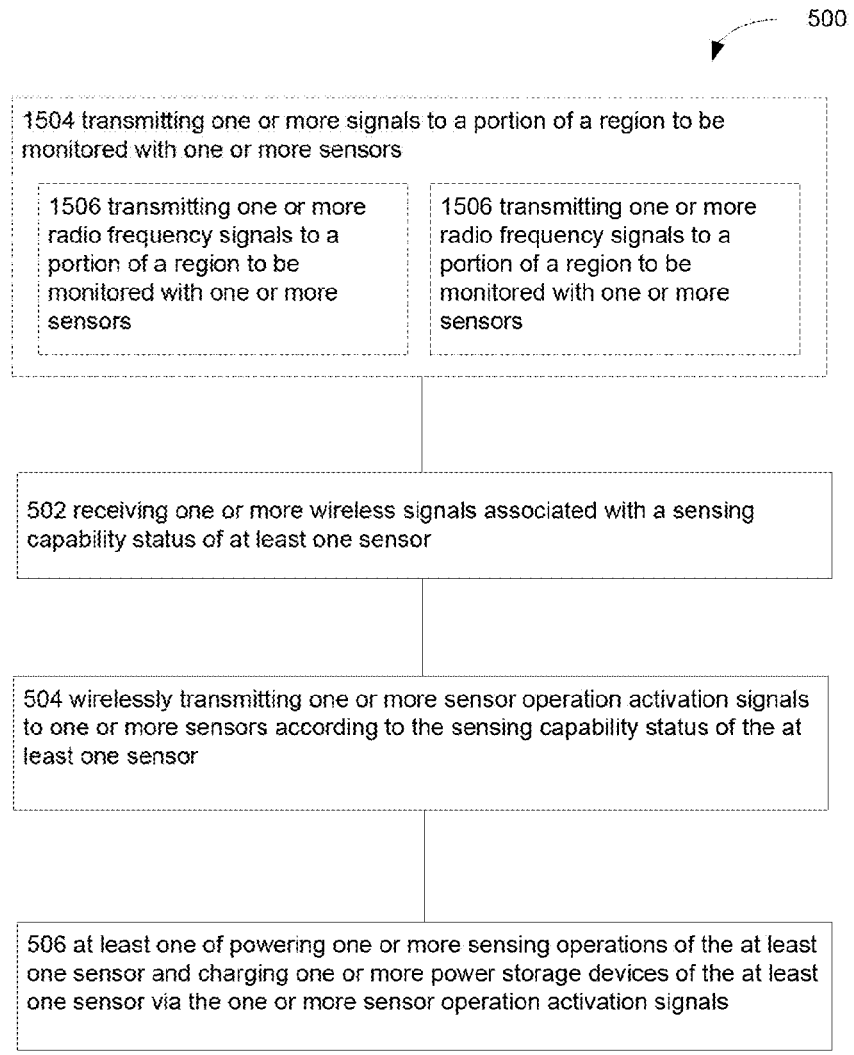

FIG. 15 illustrates an operational procedure wherein operational flow 500 of FIG. 5 may include one or more additional operations. Additional operations may include operation 1502.

Operation 1502 illustrates transmitting one or more signals to a portion of a region to be monitored with one or more sensors. For example, as shown in FIGS. 1-4, the sensor monitoring device 103 may scan the region 101 in a zonal manner whereby the sensor acquisition transceiver 110 (e.g. a radio transceiver, a microwave transceiver, an infrared transceiver, an optical/laser transceiver, and the like) is progressively directed to various portions of the region 101 and transmits the sensor acquisition signal 109. The sensor monitoring devices 103 may cycle through a defined set of portions of the region 101 maintained by the sensor location database 117 and transmit the sensor operation activation signal 120 to a given portion of the region 101 during a given time interval associated with that portion of the region 101 before moving on to transmissions to additional portions of the region 101.

FIG. 15 further illustrates an operational procedure wherein operation 1502 of operational flow 500 of FIG. 15 may include one or more additional operations. Additional operations may include operations 1504 and/or 1506.

Operation 1504 illustrates transmitting one or more radio frequency signals to a portion of a region to be monitored with one or more sensors. For example, as shown in FIGS. 1-4, the sensor acquisition transceiver 110 may be progressively directed to various portions of the region 101 and transmits a sensor acquisition signal 109 characterized by having a frequency in the radio frequency range of from about 3 kHz to 3000 GHz.

Operation 1506 illustrates transmitting one or more optical frequency signals to a portion of a region to be monitored with one or more sensors. For example, as shown in FIGS. 1-4, the sensor acquisition transceiver 110 may be progressively directed to various portions of the region 101 and transmits a sensor acquisition signal 109 characterized by having a frequency in the optical/visible frequency range of from about 500-790 THz. Use of a sensor acquisition signal 109 in the optical/visible frequency range may have the advantage that such use is largely unregulated by governmental entities.

Figure 16:
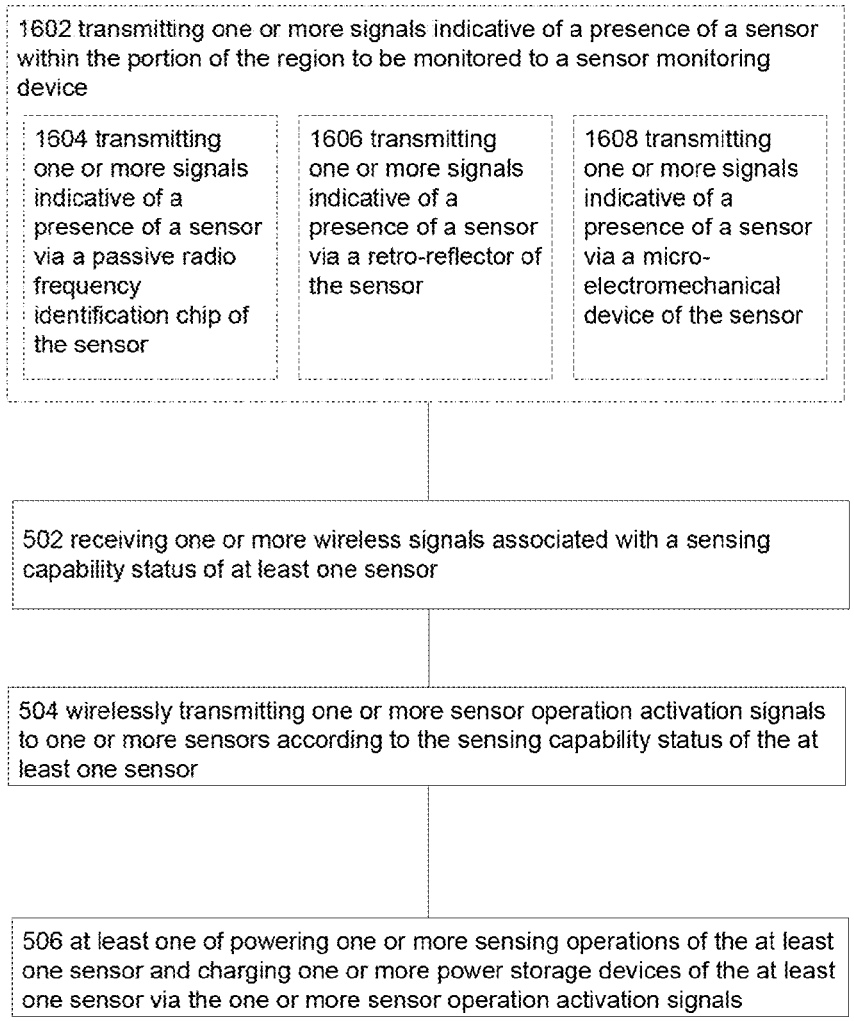

FIG. 16 illustrates an operational procedure wherein operational flow 500 of FIG. 5 may include one or more additional operations. Additional operations may include operation 1602.

Operation 1602 illustrates transmitting one or more signals indicative of a presence of a sensor within the portion of the region to be monitored to a sensor monitoring device. For example, as shown in FIGS. 1-4, upon irradiation of the sensor 102 by, for example, a sensor acquisition signal 109 wirelessly transmitted by a sensor acquisition transceiver 110 (e.g. a radio transceiver, a microwave transceiver, an infrared transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

FIG. 16 further illustrates an operational procedure wherein operation 1602 of operational flow 500 of FIG. 16 may include one or more additional operations. Additional operations may include operations 1604, 1606 and/or 1608.

Operation 1604 illustrates transmitting one or more signals indicative of a presence of a sensor via a passive radio frequency identification chip of the sensor. For example, as shown in FIGS. 1-4, the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Operation 1606 illustrates transmitting one or more signals indicative of a presence of a sensor via a retro-reflector of the sensor. For example, as shown in FIGS. 1-4, the identification signal 111 may simply be a beacon-type signal that indicates the presence of a sensor 102 within the currently scanned region. Specifically, it may be the case that the passive identification mechanism 108 is merely a reflective surface on a retro-reflector that merely reflects the sensor acquisition signal 109 back to the sensor acquisition transceiver 110 as the identification signal 111.

Operation 1608 illustrates transmitting one or more signals indicative of a presence of a sensor via a micro-electromechanical device of the sensor. For example, as shown in FIGS. 1-4, upon irradiation of the sensor 102 by, for example, a sensor acquisition signal 109 wirelessly transmitted by a sensor acquisition transceiver 110 (e.g. a radio transceiver, an optical/laser transceiver, and the like) of a sensor monitoring device 103, the sensor 102 may wirelessly transmit an identification signal 111 indicative of the presence of the sensor 102 within the region 101. For example, the passive identification mechanism 108 may include a MEMS device configured to receive the sensor acquisition signal 109, modulate that sensor acquisition signal 109 and retransmit the modulated sensor acquisition signal 109 as the identification signal 111.

Figure 17:
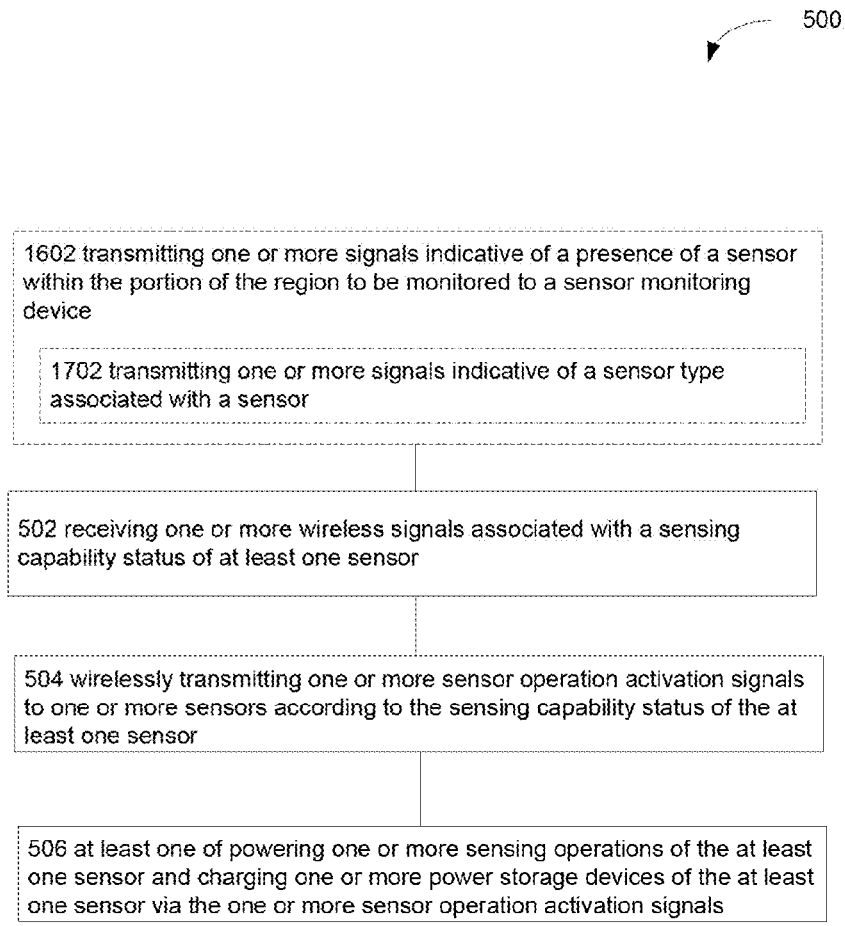

FIG. 17 illustrates an operational procedure wherein operation 1602 of operational flow 500 of FIG. 16 may include one or more additional operations. Additional operations may include operation 1702.

Operation 1702 illustrates transmitting one or more signals indicative of a sensor type associated with a sensor. For example, as shown in FIGS. 1-4, the identification signal 111 may include data associated with the sensor 102 and stored by the passive identification mechanism 108 (e.g. as an RFID chip). For example, the identification signal 111 may encode data associated with a sensor-type (e.g. thermal, pressure, motion, image, audio, electromagnetic, and the like) of the sensor 102, sensor operation requirements (e.g. operating power levels, power storage charge times, and the like), and the like.

Figure 18:
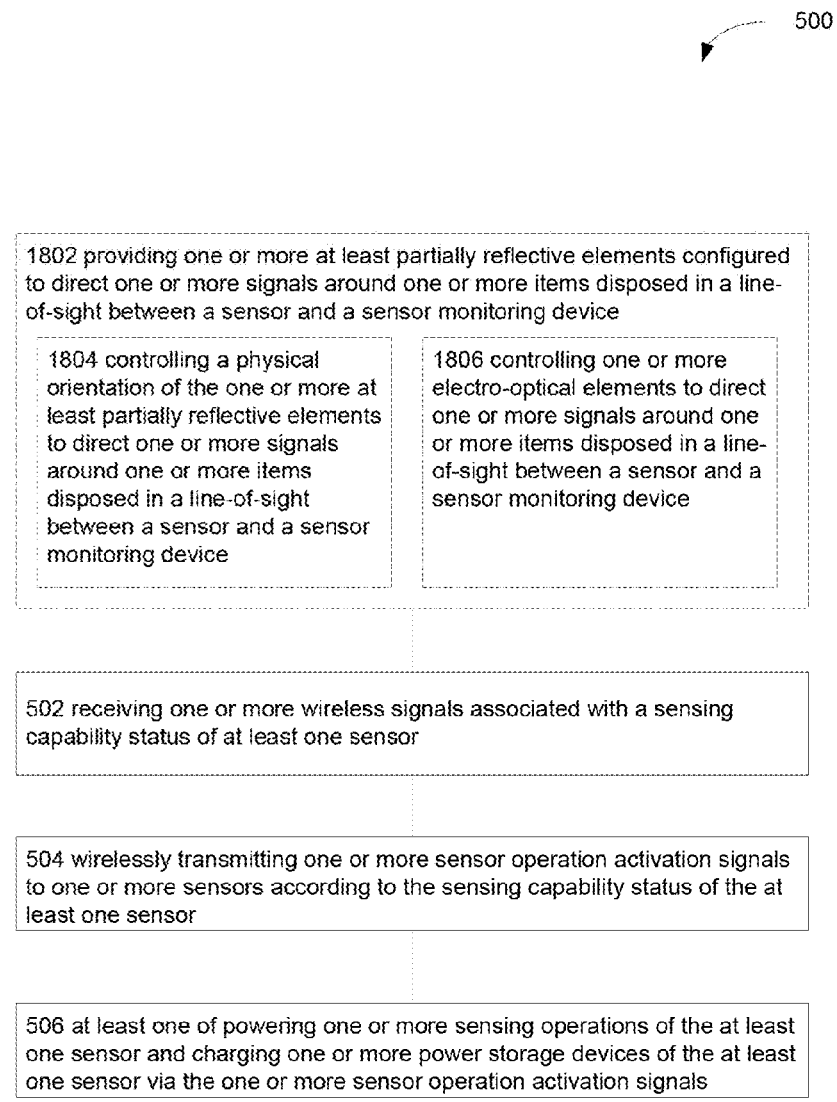

FIG. 18 illustrates an operational procedure wherein operational flow 500 of FIG. 5 may include one or more additional operations. Additional operations may include operation 1802.

Operation 1802 illustrates providing one or more at least partially reflective elements configured to direct one or more signals around one or more items disposed in a line-of-sight between a sensor and a sensor monitoring device. For example, as shown in FIGS. 1-4, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. The reflective surfaces 118 may be simple static structures such as mirrors or prisms. Alternately, the reflective surfaces 118 may be controllable structures (e.g. via a control signal generated by the sensor monitoring device 103) such that the physical orientation and/or electro-optical properties of a reflective surface 118 may be modified during a sensor location acquisition scan by the sensor monitoring device 103 of the portion of the region 101 including the reflective surface 118 such that the effective scanning area of the sensor monitoring device 103 may include portions of the region 101 which are otherwise restricted due to line-of-sight issues.

FIG. 18 further illustrates an operational procedure wherein operation 1802 of operational flow 500 of FIG. 18 may include one or more additional operations. Additional operations may include operations 1804 and/or 1806.

Operation 1804 illustrates controlling a physical orientation of the one or more at least partially reflective elements to direct one or more signals around one or more items disposed in a line-of-sight between a sensor and a sensor monitoring device. For example, as shown in FIGS. 1-4, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. In one case, the reflective surfaces 118 may be controllable structures (e.g. MEMS structures) which may include adjustable reflective surface 118 which may be physically oriented to redirect signals between the a sensor monitoring device 103 and a sensor 102.

Operation 1806 illustrates controlling one or more electro-optical elements to direct one or more signals around one or more items disposed in a line-of-sight between a sensor and a sensor monitoring device. For example, as shown in FIGS. 1-4, it may be the case that line-of-sight issues with respect to the relative orientations of the sensors 102, sensor monitoring device 103 and any intervening items 104 may exist within the region 101. For example, as shown in FIG. 1, an item 104 may be disposed between a sensor monitoring device 103 (e.g. sensor monitoring device 103A) and a sensor 102 (e.g. sensor 102A). As such, the ad hoc sensor system 100 may further include one or more at least partially reflective surfaces 118 (e.g. mirrors, electro-optical lenses, light guides, and the like). The reflective surfaces 118 may serve to remedy the line-of-sight issues for a given sensor 102 by providing an alternate signal path between a sensor monitoring device 103 and a sensor 102. In one case, the reflective surfaces 118 may be electrically controllable structures (e.g. a variable electro-optical mirror) which may include adjustable reflective surface 118 which may be physically oriented to redirect signals between the a sensor monitoring device 103 and a sensor 102.

Figure 19:
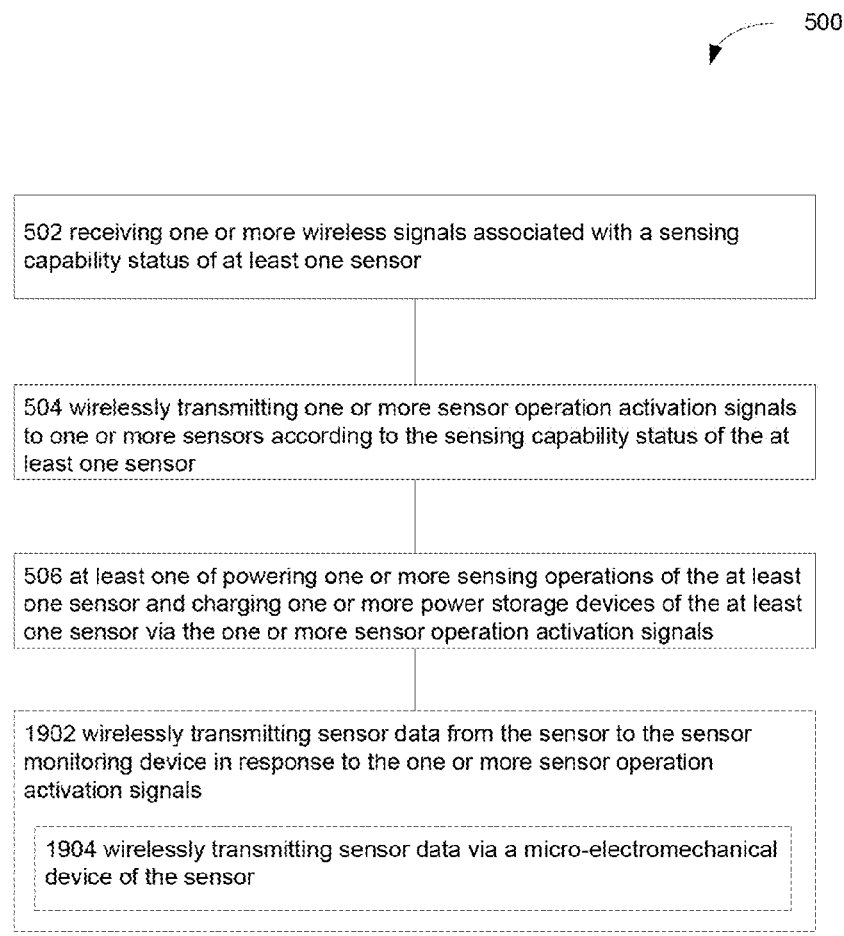

FIG. 19 illustrates an operational procedure wherein operational flow 500 of FIG. 5 may include one or more additional operations. Additional operations may include operation 1902.

Operation 1902 illustrates wirelessly transmitting sensor data from the sensor to the sensor monitoring device in response to the one or more sensor operation activation signals. For example, the sensor 102 may not employ the energy storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

FIG. 19 further illustrates an operational procedure wherein operation 1902 of operational flow 500 of FIG. 19 may include one or more additional operations. Additional operations may include operations 1904.

Operation 1904 illustrates wirelessly transmitting sensor data via a micro-electromechanical device of the sensor. For example, the sensor 102 may not employ the energy storage device 127 and/or any type of power-intensive radio transmission components. Rather, the sensing element 123 of the sensor 102 may directly receive the sensor operation activation signal 120 (e.g. an optical beam) and directly modulate that beam according to one or more sensing parameters before the modulated beam is transmitted back to the sensor monitoring device 103 as sensor data 124. For example, the sensing element 123 may be an optical sensing element 123 including at least one MEMS device. The MEMS device may be a device configured to be modified by the sensing parameter (e.g. by temperature or pressure) and modulate the sensor operation activation signal 120 according to such modifications so as to generate sensor data 124 associated with the sensing parameter.

Figure 20:
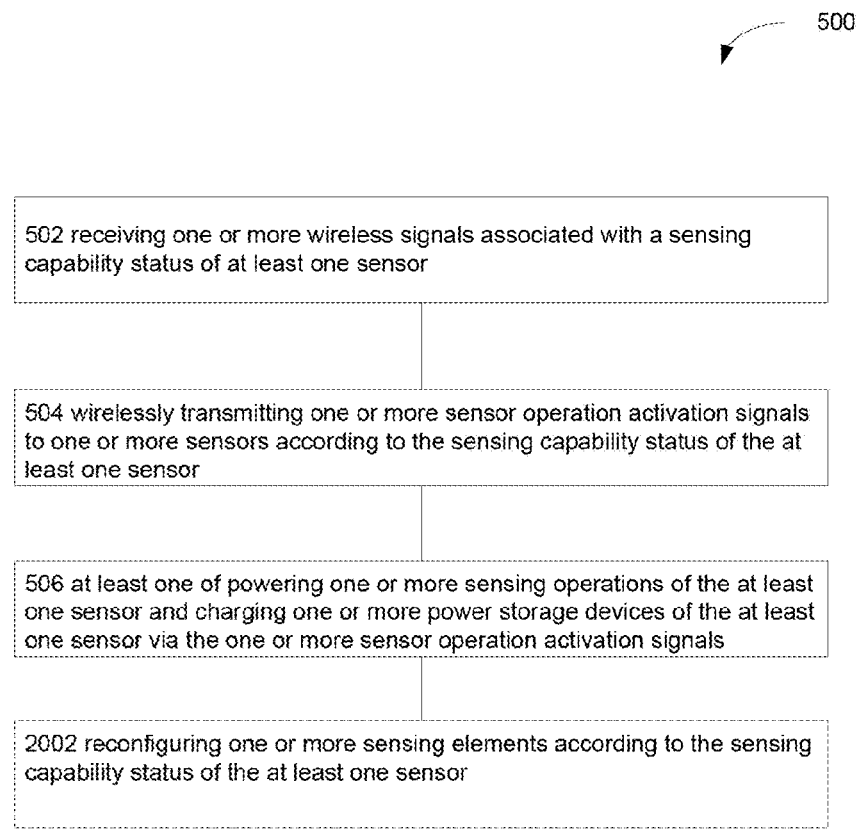

FIG. 20 illustrates an operational procedure wherein operational flow 500 of FIG. 5 may include one or more additional operations. Additional operations may include operation 2002.

Operation 2002 illustrates reconfiguring one or more sensing elements according to the sensing capability status of the at least one sensor. For example, as shown in FIG. 4B, the sensing operations of a sensing element 123 may be reconfigured according to an energy storage parameter of the energy storage device 127. For example, it may be the case that a sensing element 123 may be presently configured for full-motion color video capture sensing operations. However, it may be the case that the energy storage monitoring unit 135 may detect that the energy storage device 127 lacks sufficient energy density to properly carry out such power-intensive sensing operations. As such, the energy storage monitoring unit 135 may provide one or more configuration signals 138 to a sensing element 123 to reconfigure the sensing element 123 to operate in a less power-intensive mode (e.g. in a grayscale periodic image capture mode). Following recharging of the energy storage device 127 by the sensor operation activation signal 120, the energy storage monitoring unit 135 may provide one or more configuration signals 138 to the sensing element 123 to reconfigure the sensing element 123 to once again operate in a more power-intensive mode.

Figure 21:
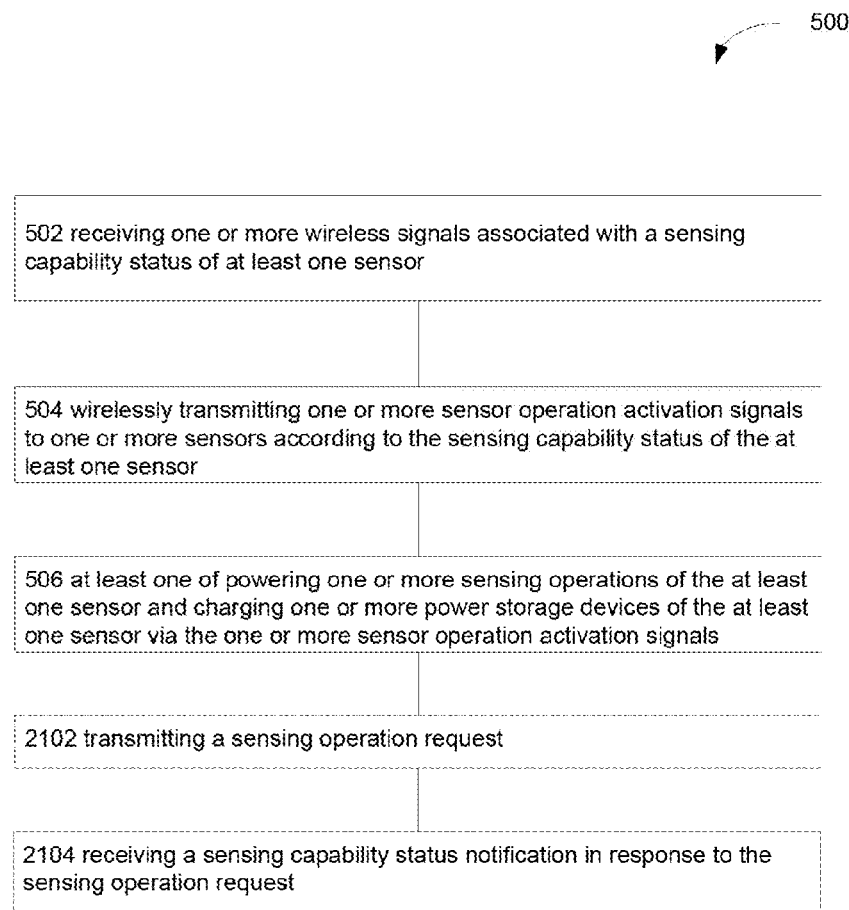

FIG. 21 illustrates an operational procedure wherein operational flow 500 of FIG. 5 may include one or more additional operations. Additional operations may include operation 2102.

Operation 2102 illustrates transmitting a sensing operation request. For example, as shown in FIGS. 1-4B, the sensor monitoring device 103 may request that a sensor 102 perform a specific sensing operation (e.g. full-motion color video capture) and transmit sensor data 124 accordingly.

FIG. 21 further illustrates an operational procedure wherein the operational flow 500 of FIG. 21 may include one or more additional operations. Additional operations may include operations 2104.

Operation 2104 illustrates receiving a sensing capability status notification in response to the sensing operation request. For example, as shown in FIG. 4B, in response to a request by the sensor monitoring device 103 that a sensor 102 perform a specific sensing operation, the energy storage monitoring unit 135 may query the energy storage device 127 and provide the sensor capability data 136 (e.g. a notification that insufficient power is currently stored) for that particular sensing operation according to the current energy storage status of the energy storage device 127.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system for communicating with one or more sensors in an ad-hoc sensor network comprising:
   at least one computing device; and
   one or more instructions that, when implemented in the at least one computing device, program the at least one computing device for:
   receiving one or more wireless signals indicating a sensing capability status of at least one sensor;
   wirelessly transmitting one or more sensor operation activation signals to one or more sensors according to the sensing capability status of the at least one sensor; and
   causing at least one of powering one or more sensing operations of the at least one sensor or charging one or more power storage devices of the at least one sensor via the one or more sensor operation activation signals.

2. The system of claim 1, wherein the receiving one or more wireless signals indicating a sensing capability status of at least one sensor includes:
   receiving one or more wireless signals indicating an energy density status of the power storage device of at least one sensor.

3. The system of claim 1, wherein the receiving one or more wireless signals indicating a sensing capability status of at least one sensor includes:
   receiving one or more wireless signals indicating a capability to perform a first sensing operation and an inability to perform a second sensing operation.

4. The system of claim 1, wherein the wirelessly transmitting one or more sensor operation activation signals to one or more sensors according to the sensing capability status of the at least one sensor further includes:
   wirelessly transmitting one or more sensor operation activation signals to one or more sensors according to a programmed schedule.

5. The system of claim 1, wherein the wirelessly transmitting one or more sensor operation activation signals to one or more sensors according to the sensing capability status of the at least one sensor includes:
   wirelessly transmitting one or more sensor operation activation signals to one or more sensors according to one or more external control signals.

6. The system of claim 5, wherein the wirelessly transmitting one or more sensor operation activation signals to one or more sensors according to the sensing capability status of the at least one sensor includes:
   wirelessly transmitting one or more sensor operation activation signals to one or more sensors according to one or more external control signals received from at least one external device.

7. The system of claim 5, wherein the wirelessly transmitting one or more sensor operation activation signals to one or more sensors according to the sensing capability status of the at least one sensor includes:
   wirelessly transmitting one or more sensor operation activation signals to one or more sensors according to one or more external control signals received from one or more switches.

8. The system of claim 1, wherein the wirelessly transmitting one or more sensor operation activation signals to one or more sensors according to the sensing capability status of the at least one sensor includes:
   wirelessly transmitting one or more sensor operation activation signals to one or more sensors according one or more sensor signals indicative of a presence or absence of one or more objects within the portion of a region including at least one sensor.

9. The system of claim 1, wherein the causing at least one of powering one or more sensing operations of the at least one sensor or charging one or more power storage devices of the at least one sensor via the one or more sensor operation activation signals includes:
powering one or more thermal sensing operations of a sensor via the one or more sensor operation activation signals.

10. The system of claim 1, wherein the causing at least one of powering one or more sensing operations of the at least one sensor or charging one or more power storage devices of the at least one sensor via the one or more sensor operation activation signals includes:
powering one or more pressure sensing operations of a sensor via the one or more sensor operation activation signals.

11. The system of claim 1, wherein the causing at least one of powering one or more sensing operations of the at least one sensor or charging one or more power storage devices of the at least one sensor via the one or more sensor operation activation signals includes:
powering one or more motion sensing operations of a sensor via the one or more sensor operation activation signals.

12. The system of claim 1, wherein the causing at least one of powering one or more sensing operations of the at least one sensor or charging one or more power storage devices of the at least one sensor via the one or more sensor operation activation signals includes:
powering one or more image sensing operations of a sensor via the one or more sensor operation activation signals.

13. The system of claim 1, wherein the causing at least one of powering one or more sensing operations of the at least one sensor or charging one or more power storage devices of the at least one sensor via the one or more sensor operation activation signals includes:
powering one or more audio sensing operations of a sensor via the one or more sensor operation activation signals.

14. The system of claim 1, wherein the causing at least one of powering one or more sensing operations of the at least one sensor or charging one or more power storage devices of the at least one sensor via the one or more sensor operation activation signals includes:
powering one or more electromagnetic radiation sensing operations of a sensor via the one or more sensor operation activation signals.

15. The system of claim 1, wherein the causing at least one of powering one or more sensing operations of the at least one sensor or charging one or more power storage devices of the at least one sensor via the one or more sensor operation activation signals comprises:
charging one or more batteries via the one or more sensor operation activation signals.

16. The system of claim 1, wherein the causing at least one of powering one or more sensing operations of the at least one sensor or charging one or more power storage devices of the at least one sensor via the one or more sensor operation activation signals comprises:
charging one or more capacitors via the one or more sensor operation activation signals.

17. The system of claim 1, further comprising:
powering one or more sensing operations of a sensor via the one or more power storage devices.

18. The system of claim 1, further comprising:
receiving one or more wireless signals indicative of a presence of a sensor within a portion of a region to be monitored.

19. The system of claim 18, wherein the receiving one or more wireless signals indicative of a presence of a sensor within a portion of a region to be monitored includes:
receiving one or more wireless signals indicative of a presence of a sensor within a portion of a region to be monitored with one or more sensor monitoring devices pluggable into one or more power sources.

20. The system of claim 18, further comprising:
transmitting one or more signals to a portion of a region to be monitored with one or more sensors.

21. The system of claim 20,
wherein the transmitting one or more signals to a portion of a region to be monitored with one or more sensors includes:
transmitting one or more signals to one or more sensors via a device independent of a sensor monitoring device; and
wherein the wirelessly transmitting one or more sensor operation activation signals to one or more sensors according to the sensing capability status of the at least one sensor includes:
transmitting one or more signals to one or more sensors according to the location data with the sensor monitoring device.

22. The system of claim 20,
wherein the transmitting one or more signals to a portion of a region to be monitored with one or more sensors includes:
transmitting one or more lower-power signals to one or more sensors with a sensor monitoring device; and
wherein the wirelessly transmitting one or more sensor operation activation signals to one or more sensors according to the sensing capability status of the at least one sensor includes:
transmitting one or more higher-power signals to the one or more sensors with the sensor monitoring device.

23. The system of claim 1, further comprising:
transmitting one or more signals indicative of a presence of a sensor within the portion of the region to be monitored to a sensor monitoring device.

24. The system of claim 1, further comprising:
providing one or more at least partially reflective elements configured to direct one or more signals around one or more items disposed in a line-of-sight between a sensor and a sensor monitoring device.

25. The system of claim 1, further comprising:
wirelessly transmitting sensor data from the sensor to the sensor monitoring device in response to the one or more sensor operation activation signals.

26. The system of claim 1, further comprising:
reconfiguring one or more sensing elements according to the sensing capability status of the at least one sensor.

27. The system of claim 1, further comprising:
transmitting a sensing operation request.

28. The system of claim 27, further comprising:
receiving a sensing capability status notification in response to the sensing operation request.

29. A system for communicating with one or more sensors in an ad-hoc sensor network comprising:
means for receiving one or more wireless signals indicating a sensing capability status of at least one sensor;

means for wirelessly transmitting one or more sensor operation activation signals to one or more sensors according to the sensing capability status of the at least one sensor; and means for causing at least one of powering one or more sensing operations of the at least one sensor or charging one or more power storage devices of the at least one sensor via the one or more sensor operation activation signals.

30. A system for communicating with one or more sensors in an ad-hoc sensor network comprising:

circuitry for receiving one or more wireless signals indicating a sensing capability status of at least one sensor;

circuitry for wirelessly transmitting one or more sensor operation activation signals to one or more sensors according to the sensing capability status of the at least one sensor; and circuitry for causing at least one of powering one or more sensing operations of the at least one sensor or charging one or more power storage devices of the at least one sensor via the one or more sensor operation activation signals.

\* \* \* \* \*